(12) United States Patent
Higaki et al.

(10) Patent No.: US 8,898,683 B2
(45) Date of Patent: Nov. 25, 2014

(54) DISC DRIVE UNIT AND APPARATUS HAVING THE SAME

(71) Applicant: Panasonic Corporation, Osaka (JP)

(72) Inventors: Hitoshi Higaki, Osaka (JP); Hiroshi Takahashi, Osaka (JP); Tatsuro Nishi, Osaka (JP); Norikatsu Yoshida, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/927,229

(22) Filed: Jun. 26, 2013

(65) Prior Publication Data

US 2014/0007143 A1    Jan. 2, 2014

(30) Foreign Application Priority Data

Jun. 28, 2012    (JP) .................. 2012-145783

(51) Int. Cl.
| | | |
|---|---|---|
| *G11B 17/053* | (2006.01) | |
| *G11B 17/22* | (2006.01) | |
| *G11B 17/056* | (2006.01) | |
| *G11B 17/26* | (2006.01) | |

(52) U.S. Cl.
CPC ............ *G11B 17/056* (2013.01); *G11B 17/225* (2013.01)
USPC ..... 720/610; 720/614; 369/30.85; 369/30.87; 369/30.92

(58) Field of Classification Search
CPC .. G11B 17/225; G11B 15/685; G11B 17/056; G11B 33/125
USPC ................ 720/601, 610, 614, 653; 369/30, 7, 369/30.76, 30.85, 30.87, 30.92, 34.01
See application file for complete search history.

(56) References Cited

U.S. PATENT DOCUMENTS

| | | | | |
|---|---|---|---|---|
| 8,448,195 | B2 * | 5/2013 | Tagami et al. | ................ 720/614 |
| 2008/0172683 | A1 * | 7/2008 | Suenaga | ...................... 720/601 |

FOREIGN PATENT DOCUMENTS

| | | | |
|---|---|---|---|
| JP | 2000-117553 | | 4/2000 |
| JP | 2009238352 | A * | 10/2009 |
| JP | 2011-204311 | | 10/2011 |
| JP | 2013206498 | A * | 10/2013 |
| WO | WO 2009066538 | A1 * | 5/2009 |

* cited by examiner

*Primary Examiner* — Will J Klimowicz
(74) *Attorney, Agent, or Firm* — Wenderoth, Lind & Ponack, L.L.P.

(57) ABSTRACT

A disc drive unit is configured with a plurality of disc drives as one unit. At least one of a pair of opposed disc drives arranged on an identical horizontal plane is provided with a tray support member for supporting a front end of a tray of the other disc drive when the tray is ejected. The tray support member is capable of protruding from the one disc drive and withdrawing into the same.

7 Claims, 21 Drawing Sheets

(a)

(b)

(c)

Fig.16
(a)
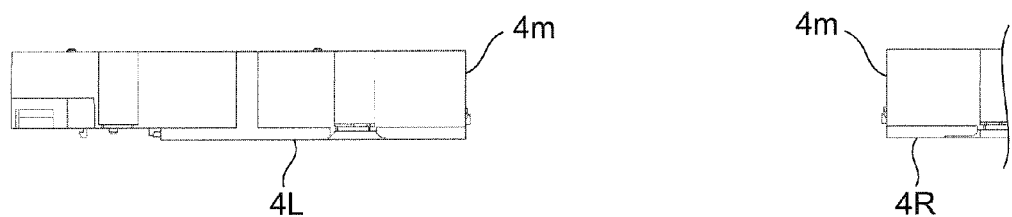
(b)
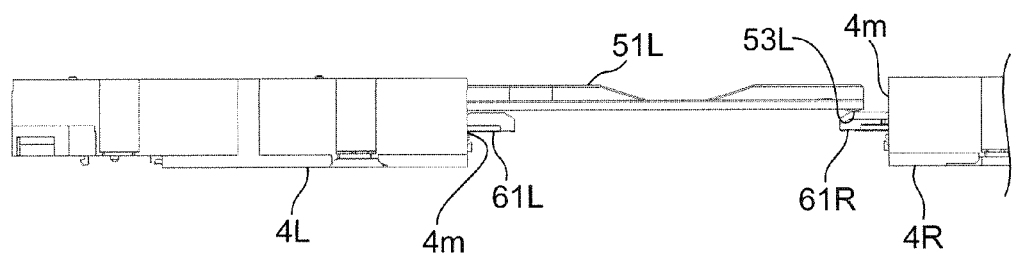
(c)
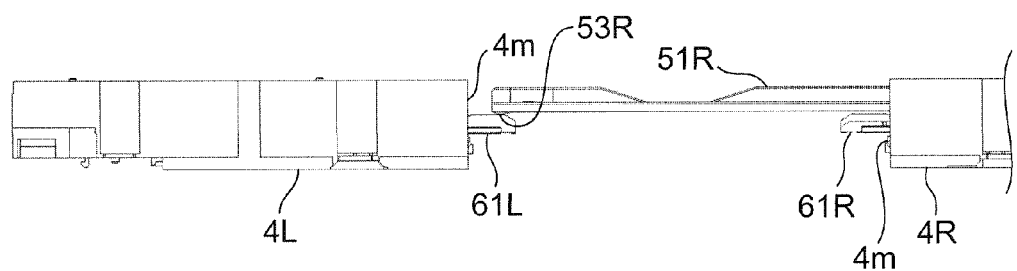

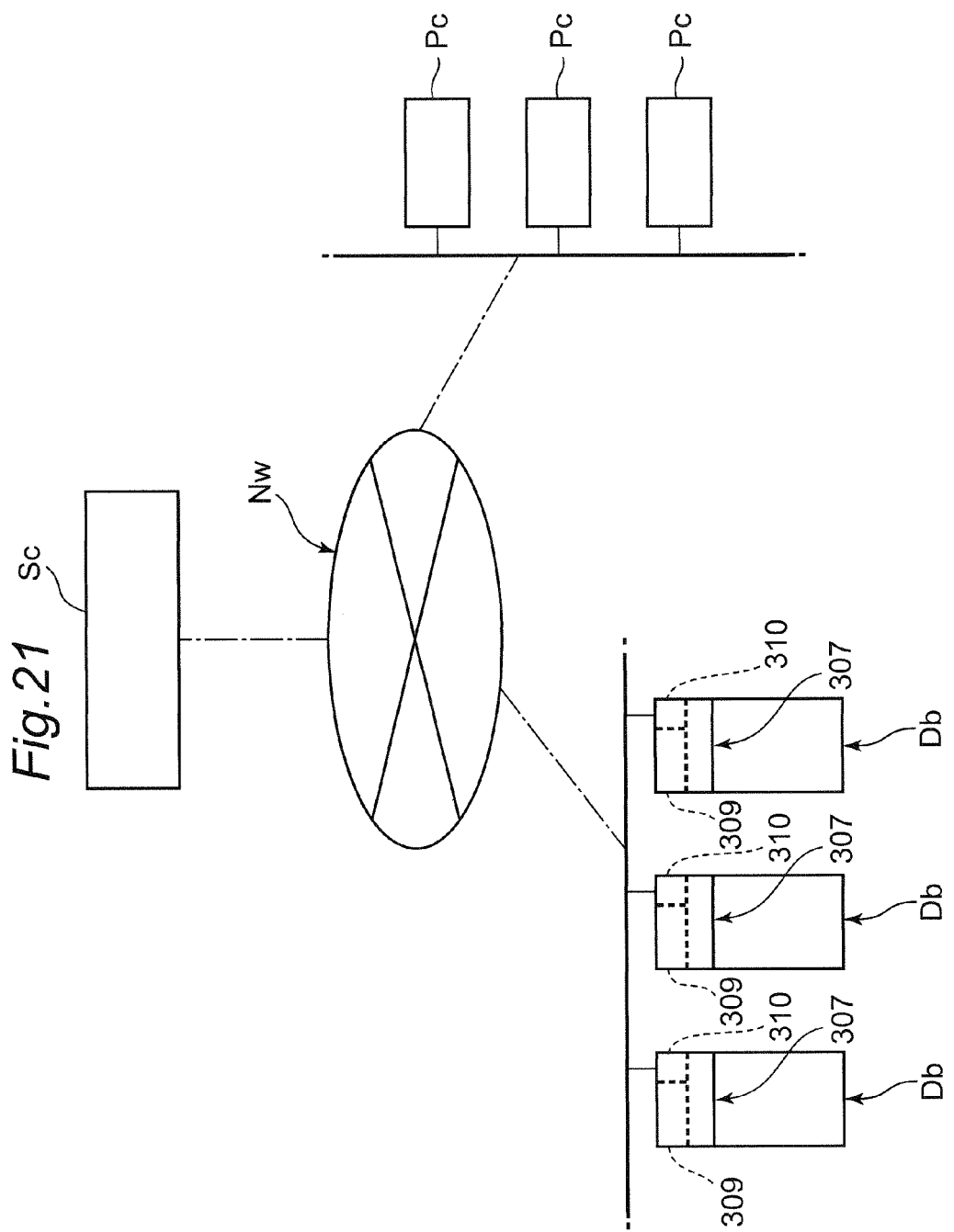

DISC DRIVE UNIT AND APPARATUS HAVING THE SAME

BACKGROUND OF THE INVENTION

1. Field of the Invention

This disclosure relates to a disc drive unit configured with a plurality of disc drives as one unit, which can be used, for example, in a disc apparatus for feeding a disc (image storage media such as CDs and DVDs) to each of the plurality of disc drives. And also, this disclosure relates to a disc apparatus provided with such the disc drive unit.

2. Description of the Related Art

As the disc apparatus for feeding the disc (disc-like information storage media such as CDs and DVDs) to each of the plurality of disc drives, for example, an apparatus described in JP 2011-204311 A (Patent Document 1) has been conventionally known. The disc apparatus in Patent Document 1 includes a cartridge (magazine) for storing a plurality of trays each storing one disc, and a plurality of disc drives. The disc apparatus in Patent Document 1 is configured to eject any tray from the magazine, suction and hold one disc stored in the ejected tray onto a suction pad, and place the disc on the tray of any disc drive.

Since the disc apparatus in Patent Document 1 is configured to store one disc in one tray, the number of discs stored in the magazine is small. In order to increase the number of the discs stored in the magazine, it is useful to directly stack the plurality of discs without interposing the tray therebetween to reduce the number of trays.

However, in this case, the adjacent discs are brought into intimate contact with each other, and thus cannot be easily separated from each other. JP 2000-117553 A (Patent Document 2) discloses a technique for solving this problem. Patent Document 2 discloses the technique of inserting a claw into the adjacent discs, thereby separating the two discs from each other to suction and hold the separated disc onto the suction pad.

PATENT DOCUMENTS

Patent Document 1: JP 2011-204311 A
Patent Document 2: JP 2000-117553 A

SUMMARY OF THE DISCLOSURE

The above mentioned disc apparatus is required to have a compact configuration. As one of approaches therefor, it is conceivable to configure a plurality of disc drives as a single unit (disc drive unit), so that a disc drive area of the disc apparatus can be made compact. For example, it is conceivable to configure two vertically-stacked rows of the disc drives and arrange the two rows of the disc drives so as to be opposed to each other. By arranging the disc drives in this manner, as to the mutually opposed disc drives, a space for ejection of the tray can be commonly use by suitably adjusting the ejection and storage timing of the trays of the mutually opposed disc drives, thereby achieving reduction of the disc apparatus in size.

To further reduce the disc apparatus in size, it is advantageous that the tray supporting length in the disc drive at ejection of the tray is made as small as possible. As the tray supporting length is shorter, the length of the disc drive in the tray stroke direction can be reduced, contributing to further reduction of the disc apparatus in size.

However, as the tray supporting length is reduced, the ejected tray is easier to undergo a deflection so that the front end thereof hangs down, due to the self-weight of the tray and the weight of the disc placed on the tray, disadvantageously interfering with the smooth and stable tray stroke action.

To cope therewith, one non-limiting and exemplary embodiment provides a disc drive unit capable of reducing the tray supporting length in the disc drive at ejection of the tray as much as possible without interfering with the tray stroke action, and making the disc drive compact in the tray stroke direction.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided a disc drive unit configured with a plurality of disc drives as one unit, wherein at least one of a pair of opposed disc drives arranged on an identical horizontal plane is provided with a tray support member for supporting a front end of a tray of the other disc drive when the tray is ejected, the tray support member being capable of protruding from the one disc drive and withdrawing into the same.

Further, according to another general aspect of the present disclosure, there is provided a disc apparatus for feeding the disc to each of the plurality of disc drives, comprising a disc drive unit configured with at least a part of the plurality of disc drives as one unit, wherein in the disc drive unit, at least one of a pair of opposed disc drives arranged on an identical horizontal plane is provided with a tray support member for supporting a front end of a tray of the other disc drive when the tray is ejected, the tray support member being capable of protruding from the one disc drive and withdrawing into the same.

In the disc drive unit according to the present disclosure, as to the pair of opposed disc drives arranged on the same horizontal plane, when the tray of the other disc drive is ejected, the front end of the tray is supported by the tray support member protruding from the one disc drive. Accordingly, in the other disc drive, even when the tray supporting length in the disc drives at ejection of the tray is made as small as possible, it is suppressed that the ejected tray undergoes a deflection so that the front end thereof hangs down. As a result, the size of the other disc drive in the tray stroke direction can be reduced without interfering with the smooth and stable tray stroke action, contributing to further reduction of the disc drive unit in size.

Further, the disc apparatus according to the present disclosure includes a disc drive unit configured with at least a part of the plurality of disc drives as one unit. In the disc drive unit, as to the pair of opposed disc drives arranged on the same horizontal plane, when the tray of the other disc drive is ejected, the front end of the tray is supported by the tray support member protruding from the one disc drive. Accordingly, in the other disc drive, even when the tray supporting length in the disc drives at ejection of the tray is made as small as possible, it is suppressed that the ejected tray undergoes a deflection so that the front end thereof hangs down. As a result, the size of the other disc drive in the tray stroke direction can be reduced without interfering with the smooth and stable tray stroke action, contributing to further reduction of the disc drive unit in size.

BRIEF DESCRIPTION OF THE DRAWINGS

FIG. 16 are side views showing a pair of opposed disc drives;

FIG. 21 is a diagram schematically showing a system configuration example for controlling the disc apparatus through a cloud computing system.

DETAILED DESCRIPTION

Figure 1:
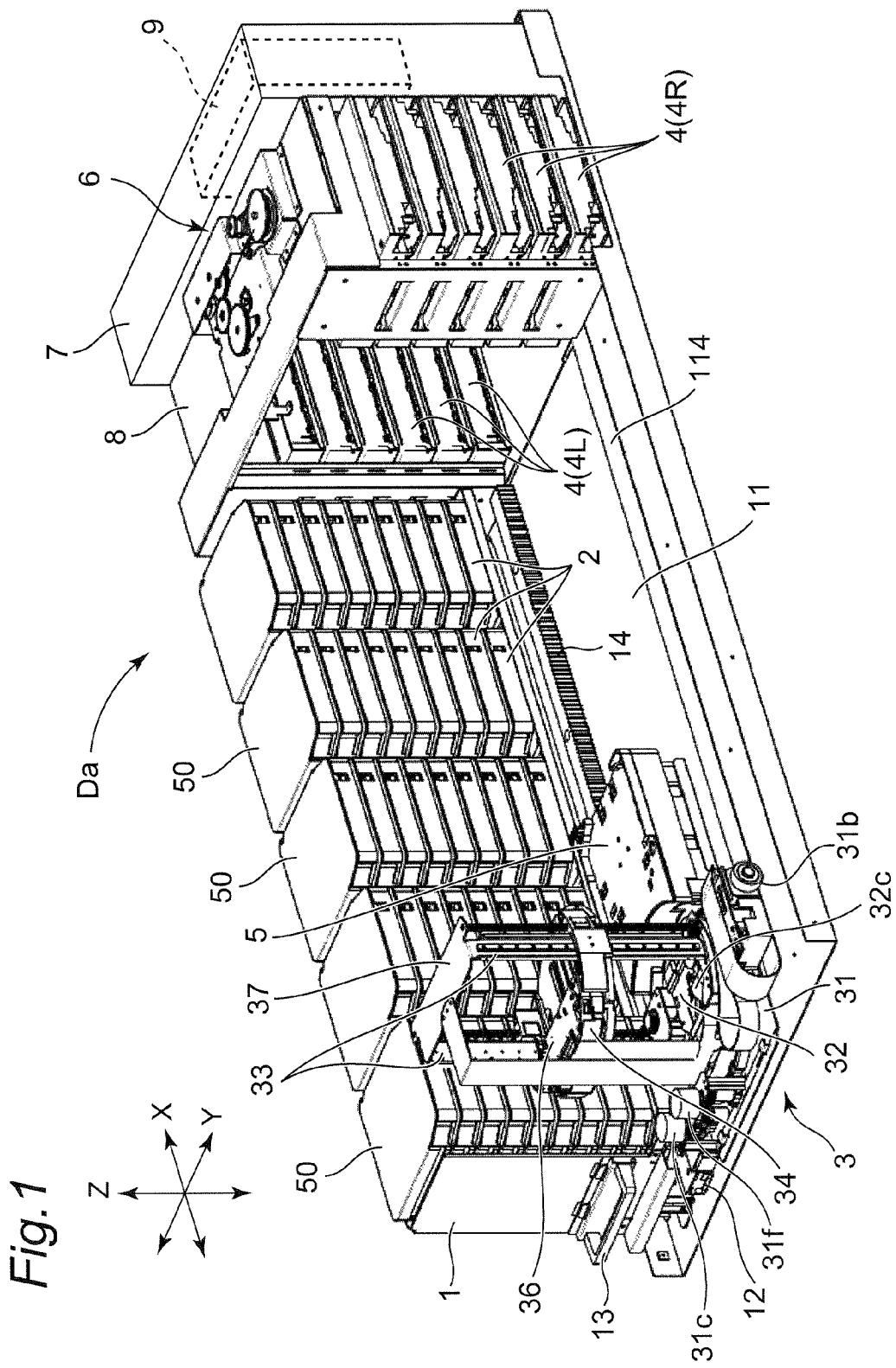
FIG. 1 is a perspective view showing a schematic configuration of a disc apparatus in accordance with an embodiment of the present disclosure.

Using the above-mentioned configuration as a basis, a disc drive unit according to the present disclosure can adopt the following modes.

That is, two rows of the vertically stacked disc drives may be configured by the plurality of disc drives and the two rows of the disc drives may be arranged so as to be opposed to each other, and at least one of a pair of the opposed disc drives arranged on the same horizontal plane may be provided with the tray support member for supporting the front end of the tray of the other disc drive when the tray is ejected, the tray support member being capable of protruding from the one disc drive and withdrawing into the same.

With this configuration, for the lot of vertically stacked disc drives constituting the two rows, size of the other disc drive in the tray stroke direction can be reduced without interfering with the smooth and stable tray stroke action, contributing reduction of the disc drive unit in size.

In the above-mentioned case, when the tray is not ejected from the other disc drive, the tray support member may be stored in the one disc drive, and when the tray of the other disc drive is ejected, the tray support member may protrude from the one disc drive by a predetermined amount and support the front end of the tray.

With this configuration, the tray support member protrudes from the one disc drive by the predetermined amount and support the front end of the tray only when the tray of the other disc drive is ejected, whereas the tray support member is stored in the one disc drive when the tray of the other disc drive is not ejected. Accordingly, when the tray of the other disc drive is not ejected, any required operation performed in a space between both the disc drives is not inhibited.

Further, in the above-mentioned case, a controller may be equipped for controlling actions of trays and tray support members of the plurality of disc drives, and when transmitting a control signal for ejecting the tray to the other disc drive, the controller may transmit a control signal for causing the tray support member to protrude from the one disc drive.

With this configuration, the action of the tray of the other disc drive and the action of the tray support member of the one disc drive can be suitably controlled according to the control signal from the controller to easily realize smooth movement of the trays and the tray support members of the pair of disc drives.

Further, in the above-mentioned case, each of the disc drives may include a driving gear for receiving power from a power source to rotate, and a sliding member having a first engaging member engageable with the tray support member and a second engaging member engageable with the tray, the sliding member being slid by rotation of the driving gear, and the driving gear may rotate in one direction to slide the sliding member in a predetermined direction, thereby causing the tray support member engaging with the first engaging member to protrude from the disc drive and causing the second engaging member to engage with the tray, resulting in that a rack tooth of the tray engages with the driving gear, and the tray is ejected from the disc drive by rotation of the driving gear in the one direction.

With this configuration, since the single power source can drive both the tray support member and the tray, the driving system for both the members can be simplified. Further, since the tray support member and the tray can be sequentially operated by rotating the driving gear in one direction, the rotation of the driving gear can be simply controlled to smoothly operate the tray support member and the tray.

In the above-mentioned case, the other disc drive may be provided with a tray support member for supporting the front end of the tray of the one disc drive when the tray is ejected, the tray support member being capable of protruding from the other disc drive and withdrawing into the same.

With this configuration, in the one disc drive as well as the other disc drive, even when the tray supporting length in the disc drives at ejection of the tray is made as small as possible, it is possible to suppress that the front end of the ejected tray hangs down. As a result, the size of one disc drive in the tray stroke direction can be reduced without interfering with the smooth and stable tray stroke action, contributing to further reduction of the disc drive unit in size.

Embodiments will be described below in detail with reference to the drawings. However, detailed description more than necessary may be omitted. For example, detailed description of well-known matters and redundant description of the substantially same configuration may be omitted. This is made to avoid unnecessary redundant description and promote understanding of those skilled in the art.

The inventor(s) provides appended drawings and following description to allow those skilled in the art to sufficiently understand this disclosure, and does not intend to limit the subject matter of Claims.

EMBODIMENT

In the following, with reference to the drawings 1-18, a description will be given of an embodiment of the present disclosure. It is to be noted that, identical reference characters are allotted to identical or corresponding parts throughout the drawings referred to in the following, and description thereof will not be repeated.

FIG. 1 is a perspective view showing the schematic structure of a disc apparatus including a magazine box according to the embodiment of the present disclosure. It is to be noted that, in the present embodiment, the left side in FIG. 1 is referred to as the "apparatus-front side", and the right side in FIG. 1 is referred to as the "apparatus-rear side".

Firstly, with reference to FIG. 1, a description will be given of an overall structure of the disc apparatus Da according to the present embodiment.

The disc apparatus Da according to the present embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown.

The magazine stocker 1 includes a plurality of (five, for example, in this embodiment) magazine boxes 50 for removably storing a plurality of disc-storing magazines 2. The five magazine boxes 50 are aligned, in the apparatus depth direction X, on the bottom chassis 11 of the disc apparatus Da (refer to, for example, FIG. 1). Each magazine box 50 can store the plurality of (nine, for example, in this embodiment) magazines 2, which are vertically arranged in the substantially horizontal position, in the magazine stocker 1.

Each magazine stocker 1 stores a plurality of magazines 2. Each magazine 2 includes magazine trays 21 (refer to FIGS. 2A and 2B) storing a plurality of (e.g., 12 pieces of) discs. Between the two magazine stockers 1, 1, a picker 3 that draws out the magazine tray 21 from one magazine 2 selected from a plurality of magazines 2 and that holds the magazine tray 21 is provided.

The picker 3 is structured to convey the held magazine tray 21 to a position near a plurality of disc drives 4 arranged at the device-rear side. The picker 3 is integrally provided with a lifter 5 that pushes out a plurality of discs from the magazine tray 21.

The disc drives 4 are each an apparatus that performs recording or reproducing of information on or from a disc. Further, the disc drives 4 are each a tray-scheme disc drive that load discs using trays. The plurality of disc drives 4 are stacked in the apparatus height direction Z.

That is, in the disc apparatus Da, two rows of the vertically stacked disc drives 4 are configured by the plurality of disc drives 4 and the two rows are arranged so as to be opposed to each other, then a disc drive unit is configured with the plurality of disc drives 4 as one unit. The detailed construction and function etc. of the disc drive unit will be described later.

The plurality of disc drives 4 in each row are arranged so as to be adjacent to the magazine stockers 1, 1 on the device-rear side. Between the plurality of disc drives 4 (4L) arranged as being stacked so as to be adjacent to one magazine stocker 1 and the plurality of disc drives 4 (4R) arranged as being stacked so as to be adjacent to the other magazine stocker 1, a carrier 6 is provided.

The carrier 6 is arranged in a housing 8 for accommodating the plurality of (e.g., 12 sets of) disc drives 4. The carrier 6 is configured to: retain a plurality of discs pushed out by the lifter 5 in such a stacked state; separate one disc from the retained plurality of discs above a tray (not shown) ejected from an arbitrary disc drive 4; and place the separated disc on the tray 21.

On the further rear side than the carrier 6 and the disc drive 4, a control unit 7 is arranged, which includes electric circuits, power source and the like. The control unit 7 is further provided with a controller 9. The operation of each constituent component of the disc apparatus Da such as picker 3, disc drive 4, carrier 6 (the operation of motor etc.) is controlled by the controller 9. The controller 9 is connected, for example, to a host computer which manages the data. Based on instructions from operator, the host computer sends commands to the controller 9 so as to perform operations such as data reading from or writing on the specified magazine 2. Based on the commands, the controller 9 controls the operation of each constituent component of the disc apparatus Da such as picker 3, disc drive 4, carrier 6 and the like.

The magazine stockers 1 are provided along guide rails 12 that slidably guide the picker 3. The guide rails 12 are provided so as to extend in an apparatus depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with partition parts (not shown) extended in the apparatus width direction Y. In each of the space surrounded by the partition parts, the magazine box 50 is stored.

Figure 2A:
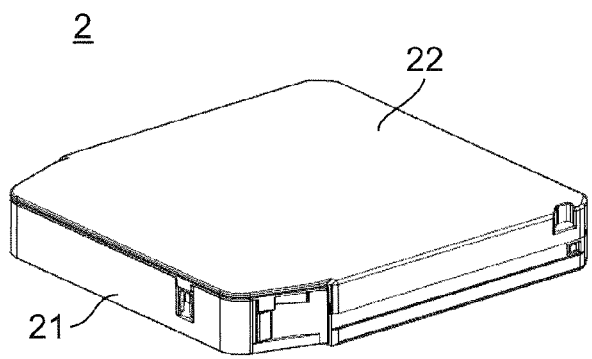
FIG. 2A is a perspective view of a magazine in the disc apparatus in FIG. 1.
Figure 2B:
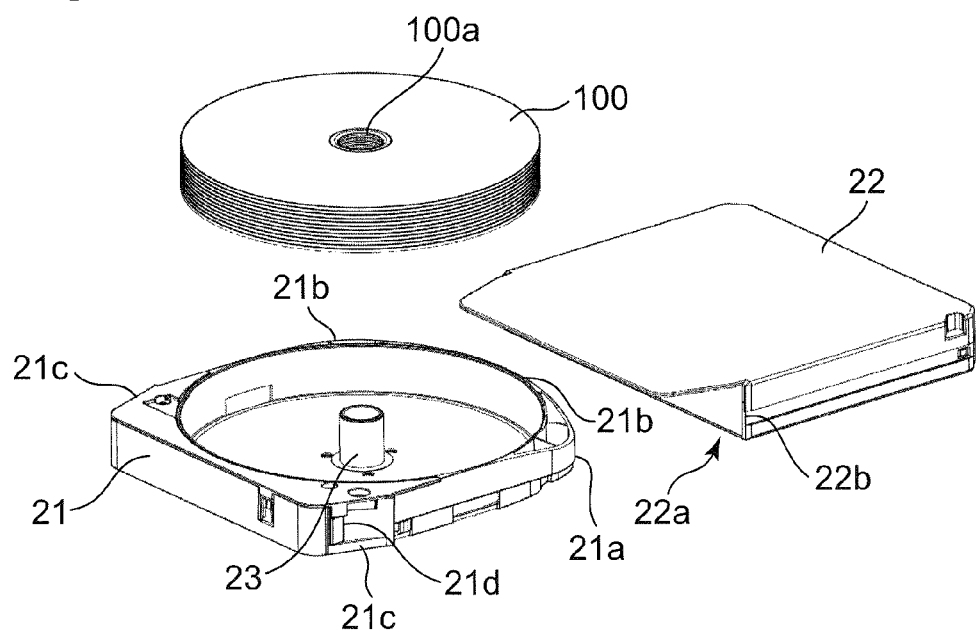
FIG. 2B is an exploded perspective view of the magazine in FIG. 2A.

As shown in FIG. 2A, the magazine 2 includes the magazine tray 21, and a case 22 that has a substantially rectangular parallelepiped shape and that stores the magazine tray 21. As shown in FIG. 2B, at the front face (one side face) of the case 22, an opening 22a into which the magazine tray 21 can be inserted and taken out is provided.

The magazine tray 21 is formed to have an outer shape being substantially rectangular in planar view. The magazine tray 21 stores a plurality of discs 100 as being stacked in close contact with one another. At the opposing corner portions that position on the back side of the magazine case 22 in a state where the magazine tray 21 is stored in the case 22, cut portions 21a, 21a are formed. Further, a side face 21b that positions on the back side of the magazine case 22 in the state where the magazine tray 21 is stored in the magazine case 22 is formed to be arc-like as a whole including the cut portions 21a, 21a.

At the opposing corner portions that position on the front face side of the case 22 in the state where the magazine tray 21 is stored in the case 22, cutout portions 21c, 21c are formed. On the inner side of the cutout portions 21c, 21c in the width direction of the magazine tray 21, engaging recess portions 21d, 21d with which a pair of hooks (not shown) of the picker 3 are formed.

The magazine tray 21 is provided with a core rod 23, which is to be inserted into a center hole 100a provided at each of the plurality of discs 100 to restrict shifting of the discs 100 in the direction of disc surface. Due to the core rod 23, the movement of the discs in a surface direction thereof is restricted to prevent damage of the discs.

Figure 3:
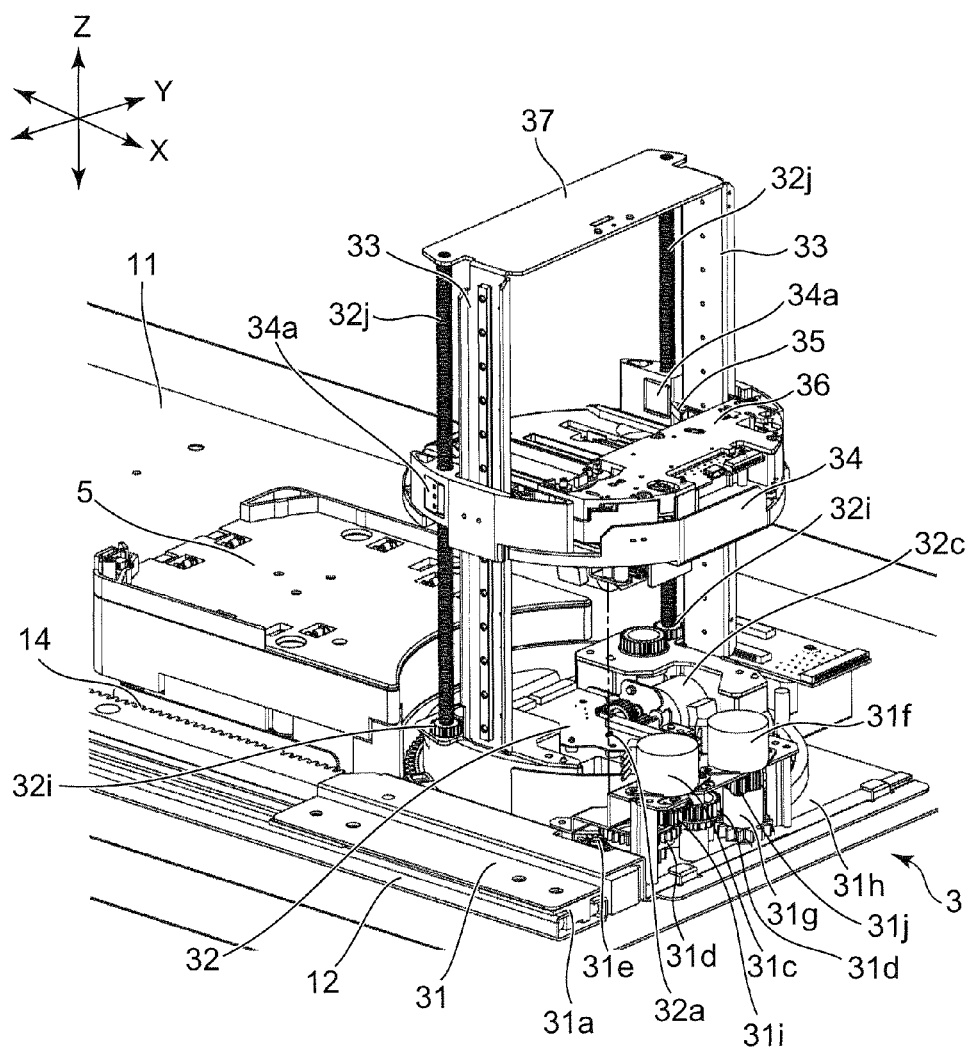
FIG. 3 is a perspective view of a picker in the disc apparatus in FIG. 1.
Figure 4:
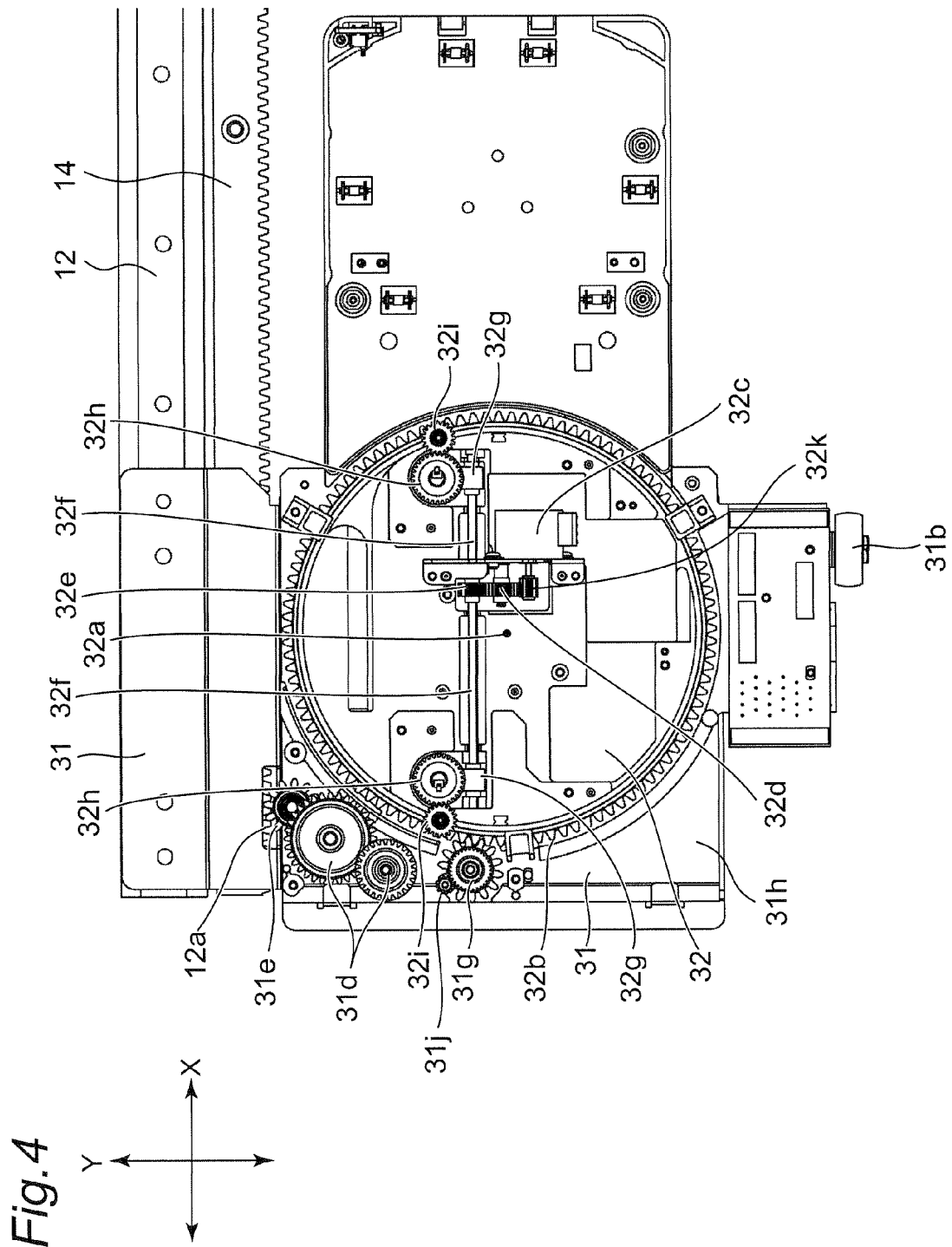
FIG. 4 is a plan view showing a configuration of a driving system of an elevating table of the picker in FIG. 3.

The picker 3 includes a run base 31. As shown in FIG. 3, a movable platform 31a slidably shifting along the guide rail 12 is attached on one magazine stocker 1 side of the run base 31. Further, as shown in FIG. 4, a roller 31b is attached on other magazine stocker 1 side of the run base 31.

As shown in FIG. 3, the run base 31 is provided with a picker motor 31c that produces drive force for causing the picker 3 to shift in the depth direction X of the disc apparatus Da (apparatus depth direction). A reduction gear 31d meshes with a motor gear 31i, into which the drive shaft of the picker motor 31c is press fitted. The reduction gear 31d meshes with a pinion gear 31e. The pinion gear 31e meshes with a rack 14 provided adjacent to the guide rail 12 to extend in the apparatus depth direction X.

When the picker motor 31c is driven, the drive force of the picker motor 31c is transferred to the pinion gear 31e via the motor gear 31i and the reduction gear 31d, to rotate the pinion gear 31e. Here, the rack 14 is fixed to the bottom chassis 11. On the other hand, the run base 31 is not fixed to the bottom chassis 11. Accordingly, when the pinion gear 31e rotates, the pinion gear 31e shifts along the rack 14, whereby the picker 3 shifts in the device depth direction X.

As the picker motor 31c, for example, a stepping motor is employed. Applying a prescribed pulse to the picker motor 31c, the picker 3 can be shifted to be located at the front of a prescribed magazine 2.

A picker base 31h made of resin is attached to the run base 31 made of a sheet metal. The picker base 31h is provided with a rotary table 32 so as to be rotatable substantially about a rotation axis 32a extending in the device height direction Z. Further, the picker base 31h is provided with a rotary table motor 31f that produces the drive force for causing the rotary table 32 to rotate. As shown in FIG. 4, a reduction gear 31g meshes with the motor gear 31j, into which the drive shaft of the rotary table motor 31f is press fitted. The reduction gear 31g meshes with a rotary table gear 32b provided at the outer circumferential portion of the rotary table 32. When the rotary table motor 31f is driven, the drive force of the rotary table motor 31f is transferred to the rotary table gear 32b via the motor gear 31j and the reduction gear 31g, whereby the rotary table 32 rotates.

The rotary table 32 is provided with a pair of up-and-down rails 33, 33 extending along the device height direction Z and opposing to each other. Between the pair of up-and-down rails 33, 33, an up-and-down table 34 is provided. Further, the rotary table 32 is provided with an up-and-down table motor 32c that produces the drive force for causing the up-and-down table 34 to rise and lower.

As shown in FIG. 4, a relay gear 32d meshes with a motor gear 32k, into which the drive shaft of the up-and-down table motor 32c is press fitted. The relay gear 32d meshes with a coupling shaft gear 32e. A coupling shaft 32f penetrates through the center portion of the coupling shaft gear 32e. Worms 32g, 32g are fixed to the opposite ends of the coupling shaft 32f. The worms 32g mesh with relay gears 32h. The relay gears 32h mesh with lead screw gears 32i. The lead screw gears 32i are fixed to lead screws 32j. The lead screws 32j are provided so as to extend in the apparatus height direction Z along the up-and-down rails 33. As shown in FIG. 3, nuts 34a provided to the up-and-down table 34 are screwed with the lead screws 32j.

When the up-and-down table motor 32c is driven, the drive force of the up-and-down table motor 32c is transferred to the lead screws 32j via the motor gear 32k, the relay gear 32d, the coupling shaft gear 32e, the coupling shaft 32f, the worms 32g, the relay gears 32h, and the lead screw gears 32i, whereby the lead screws 32j rotate. Thus, the up-and-down table 34 rises and lowers in the apparatus height direction Z along the pair of up-and-down rails 33 and 33.

Figure 8:
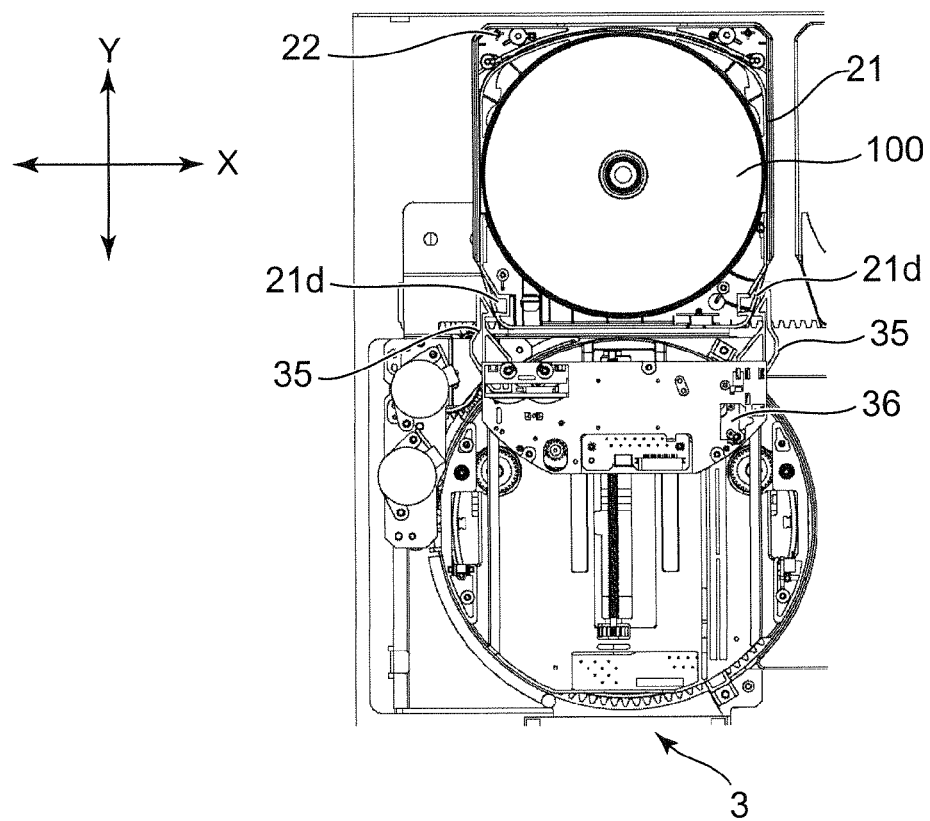
FIG. 8 is a plan view showing a state where the picker in FIG. 3 ejects the magazine tray from the magazine.

As shown in FIG. 8, the up-and-down table 34 is provided with a pair of hooks 35, 35 that can engage with engaging recess portions 21d of the magazine tray 21, and a chuck 36 functioning to open and close the pair of hooks 35, 35 and to cause the pair of hooks 35, 35 to shift forward and backward.

Figure 5:
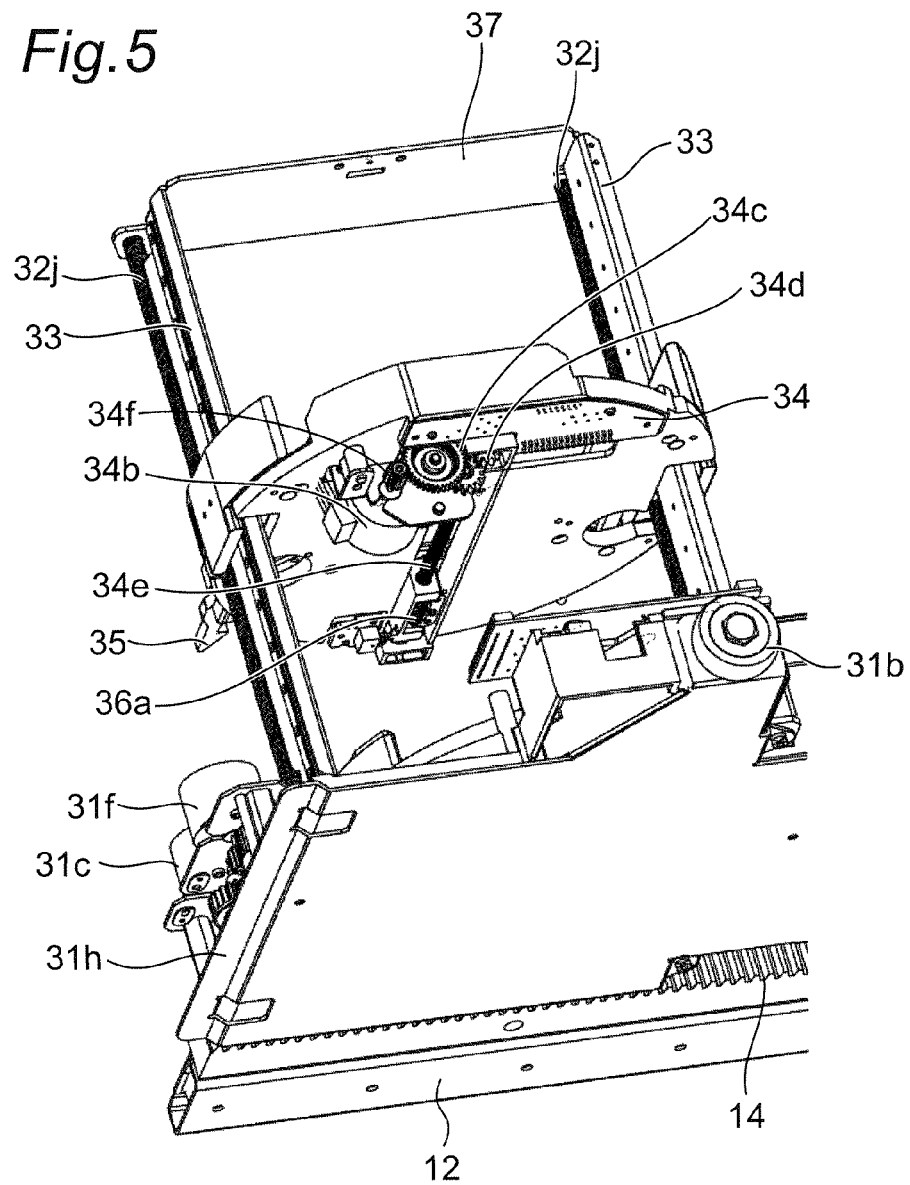
FIG. 5 is a perspective view showing the picker in FIG. 3 when viewed from diagonally below.

Further, as shown in FIG. 5, the up-and-down table 34 is provided with a chuck motor 34b. A reduction gear 34c meshes with a motor gear 34f, into which the drive shaft of the chuck motor 34b is press fitted. The reduction gear 34c meshes with a lead screw gear 34d. The lead screw gear 34d is fixed to a lead screw 34e. The lead screw 34e is provided to extend in the direction perpendicular to the line connecting between the pair of up-and-down rails 33 and 33. A nut 36a fixed to the chuck 36 is screwed with the lead screw 34e.

When the chuck motor 34b is driven, the drive force of the chuck motor 34b is transferred to the nut 36a via the motor gear 34f, the reduction gear 34c, the lead screw gear 34d, and the lead screw 34e, whereby the chuck 36 shifts along the lead screw 34e.

Further, the chuck 36 is structured to be capable of adjusting the interval of the pair of hooks 35, 35. By the chuck 36 reducing the interval between the pair of hooks 35, 35, the pair of hooks 35, 35 can engage with the engaging recess portions 21d, 21d of the magazine tray 21. On the other hand, by the chuck 36 increasing the interval of the pair of hooks 35, 35, the engaged state between the pair of hooks 35, 35 and the engaging recess portions 21d, 21d of the magazine tray 21 can be released.

The paired up-and-down rails 33 are attached to opposite side faces of a U-shaped angle plate 37, respectively. The top end portions of the paired lead screws 32j are rotatably attached to the top face of the angle plate 37.

The picker motor 31c, the rotary table motor 31f, the up-and-down table motor 32c, and the chuck motor 34b are connected to the controller 9 in the control unit 7 via an FFC (flexible flat cable) 114 (see FIG. 1), and drive under control of the controller 9.

Figure 6:
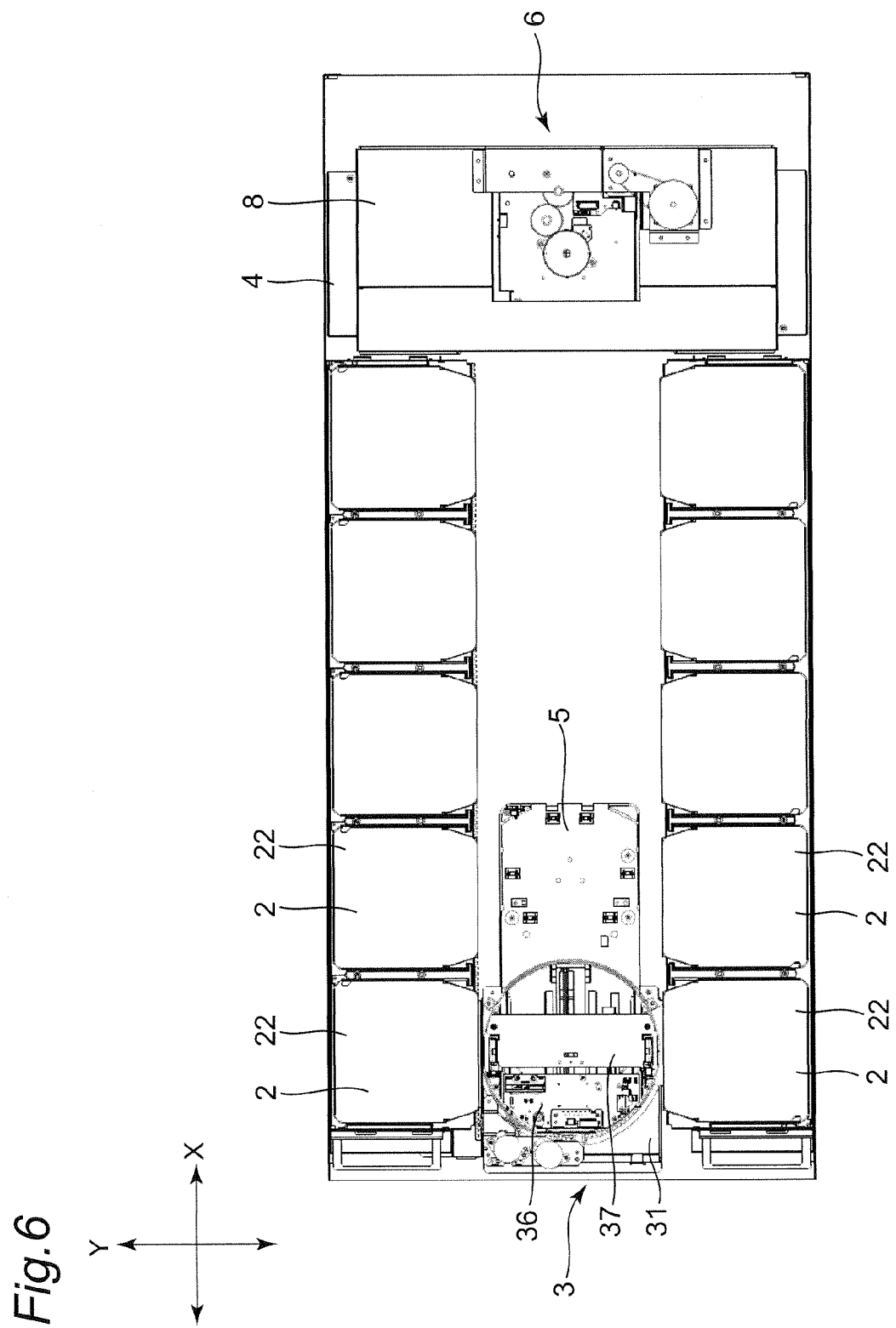
FIG. 6 is a plan view showing a state where the picker in FIG. 3 moves to the front of a magazine selected from a plurality of magazines.
Figure 7:
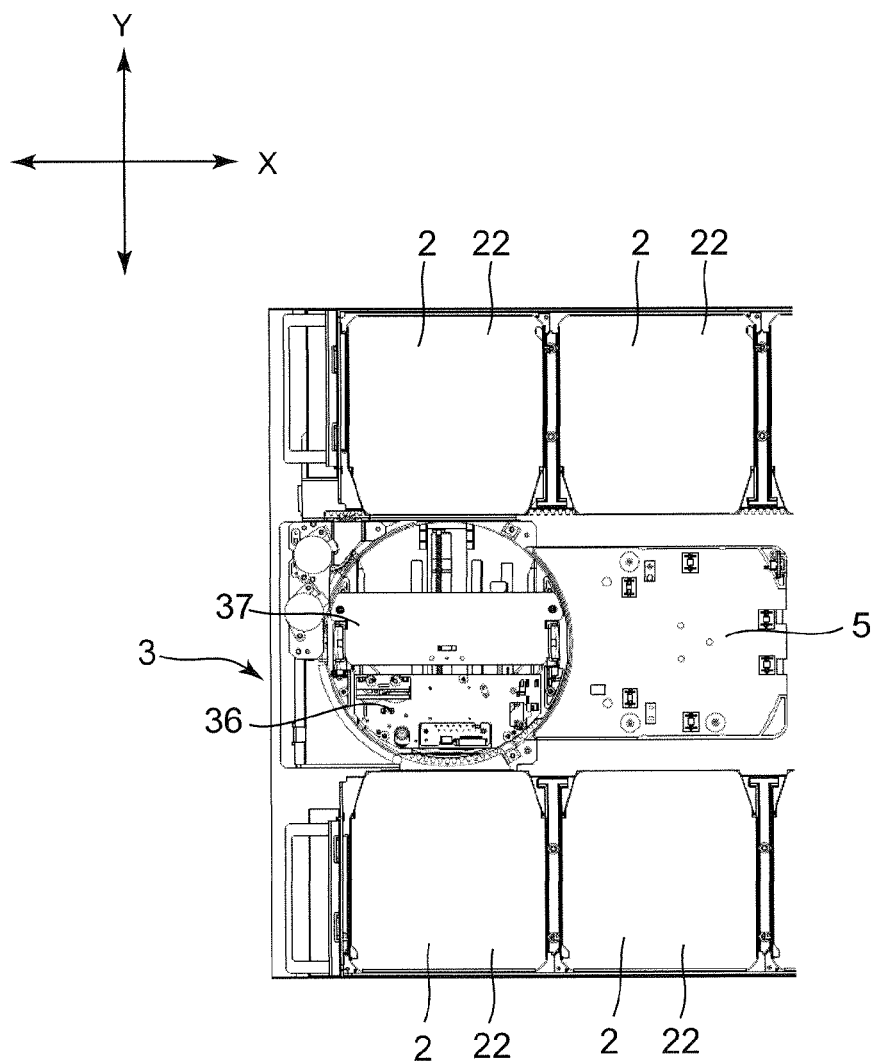
FIG. 7 is a plan view showing a state where the picker in FIG. 3 ejects a magazine tray from the magazine.

FIGS. 6 to 12 each show the manner of the picker 3 drawing out the magazine tray 21 from the case 22. As the run base 31 runs in the device depth direction X and the up-and-down table 34 rises and lowers in the device height direction Z along the pair of up-and-down rails 33, as shown in FIG. 6, the picker 3 shifts to the location at the front of one magazine 2 selected from a plurality of magazines 2. Further, as shown in FIG. 7, the rotary table 32 is rotated so that the chuck 36 is oriented to the front side of the magazine 2.

Figure 9:
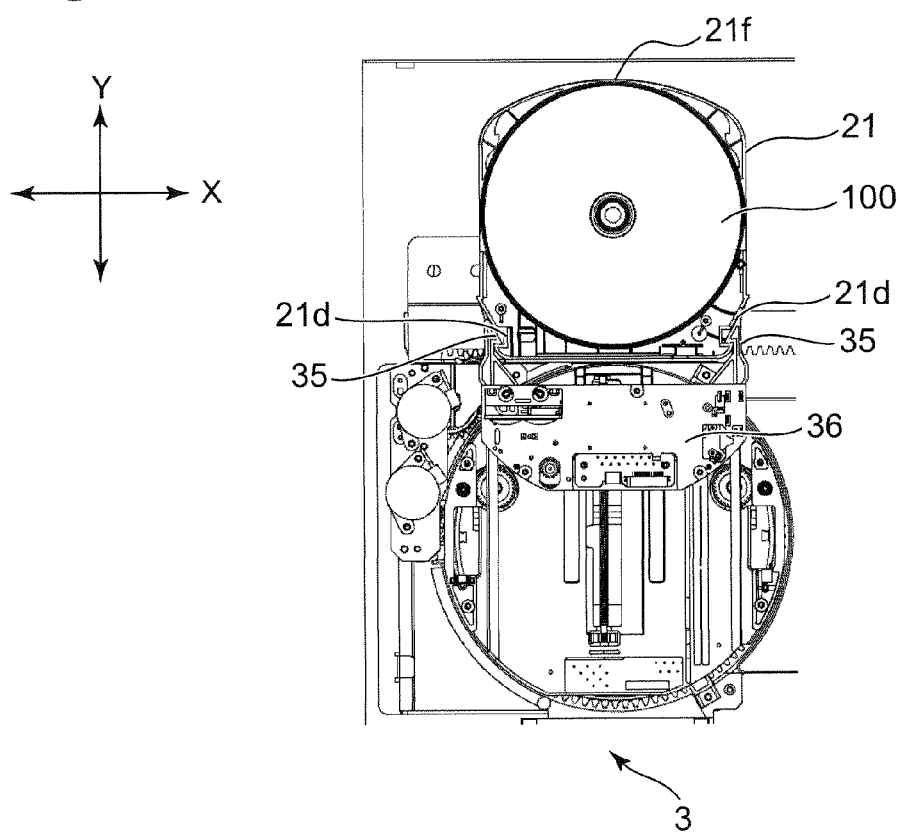
FIG. 9 is a plan view showing a state where the picker in FIG. 3 ejects the magazine tray from the magazine.

Thereafter, as shown in FIG. 8, the chuck 36 advances toward the magazine tray 21, whereby, as shown in FIG. 9, the pair of hooks 35, 35 is engaged with the engaging recess portions 21d, 21d of the magazine tray 21. In this state, by the chuck 36 receding from the case 22, the magazine tray 21 is drawn out from the case 22.

Figure 10:
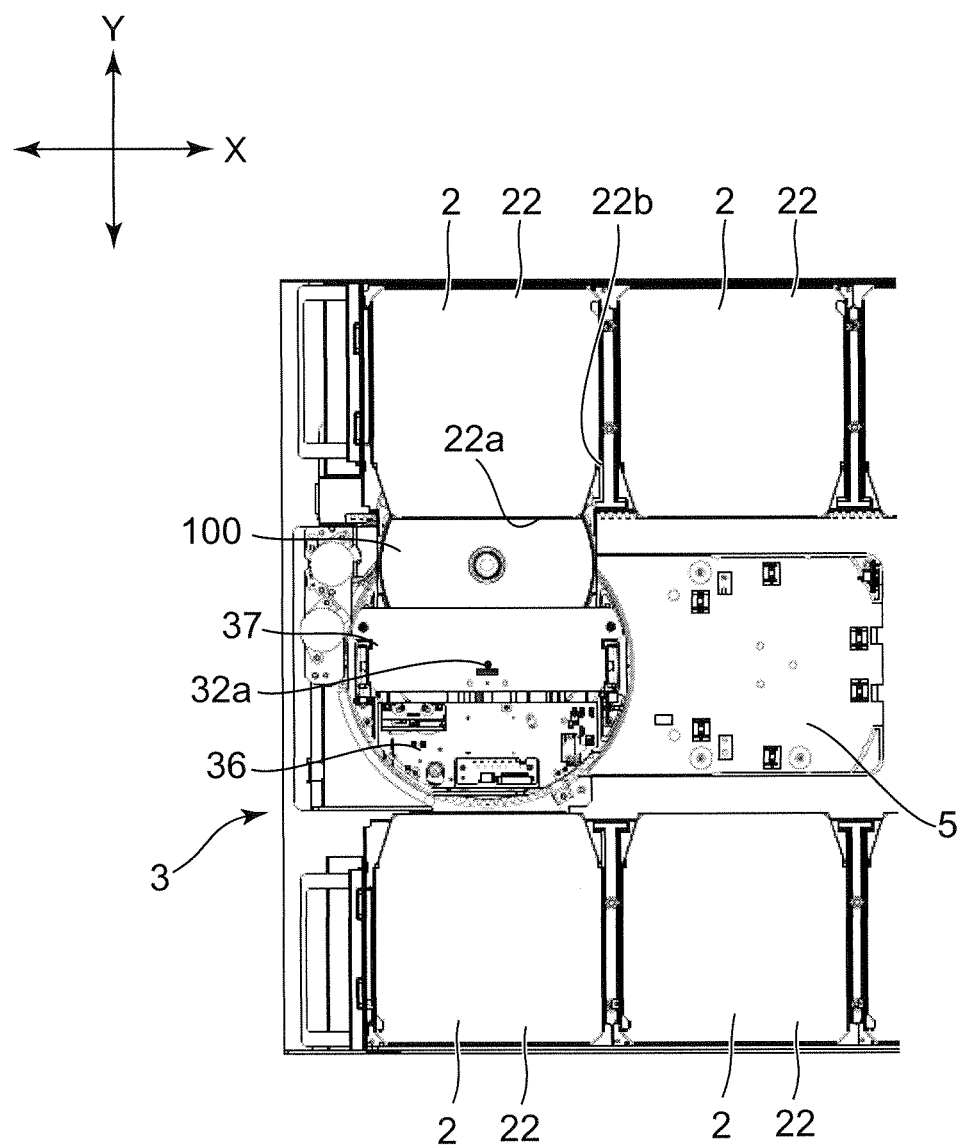
FIG. 10 is a plan view showing a state where the picker in FIG. 3 ejects the magazine tray from the magazine.
Figure 11:
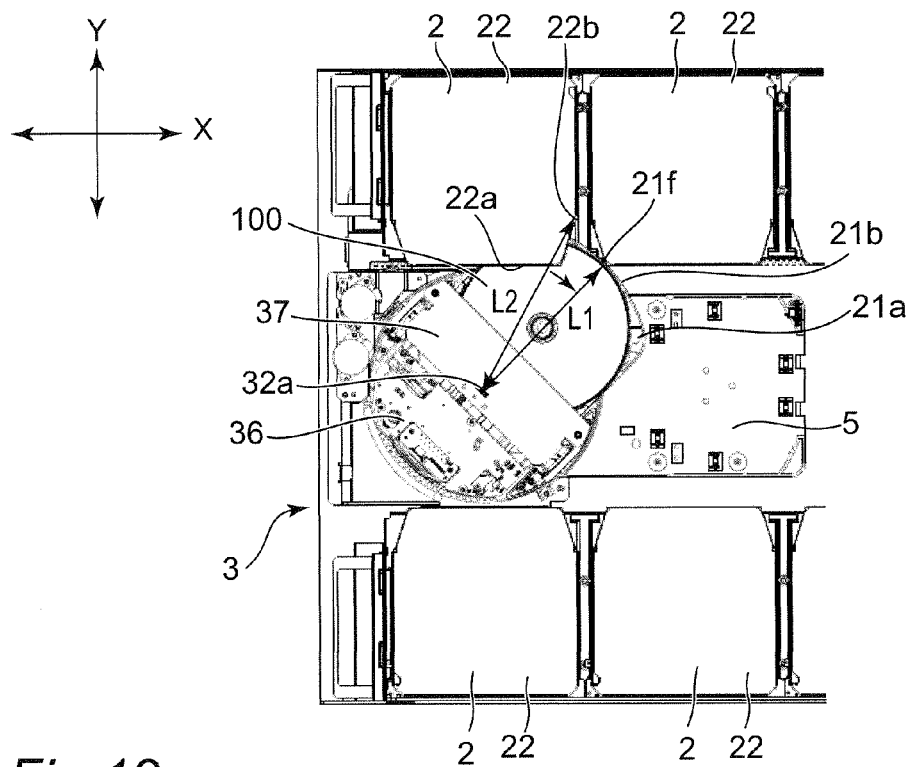
FIG. 11 is a plan view showing a state where the picker in FIG. 3 ejects the magazine tray from the magazine.
Figure 12:
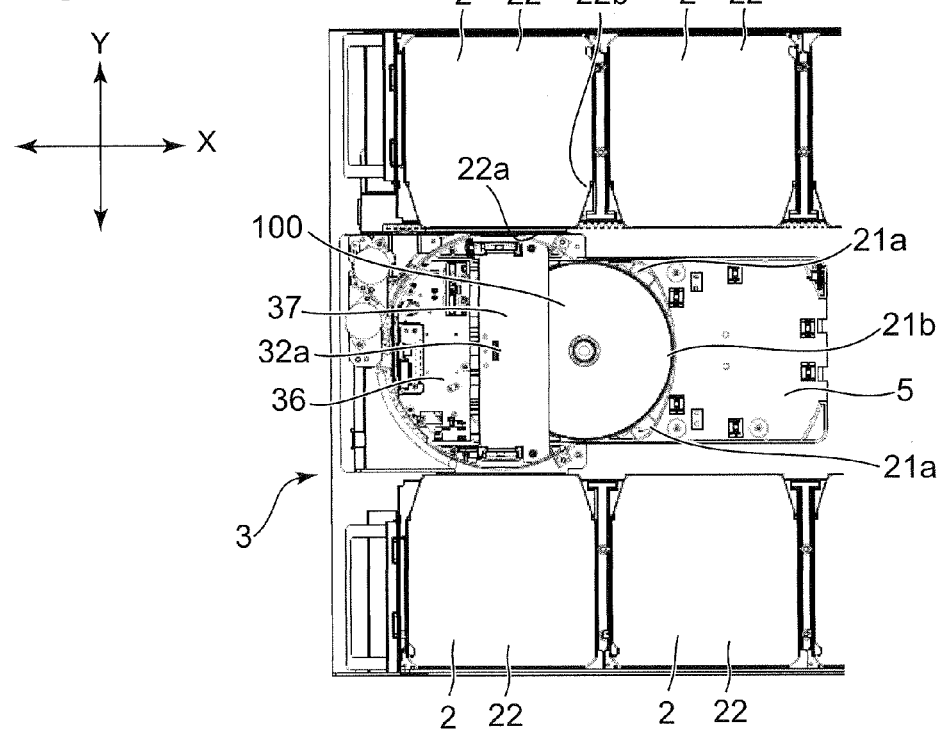
FIG. 12 is a plan view showing a state where the picker in FIG. 3 has ejected the magazine tray from the magazine.

As shown in FIG. 10, by the chuck 36 receding (i.e., shifting to the location at the front of the case 22), after the cut portions 21a of the magazine tray 21 pass through the opening 22a of the case 22, the rotary table 32 rotates clockwise substantially about the rotation axis 32a. In other words, as shown in FIG. 11, when the distance L1 between a vertex 21f (i.e., the position farthest from the rotation axis 32a) of the side face 21b of the magazine tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 11 and 12, the magazine tray 21 rotates substantially about the rotation axis 32a. As a result, as shown in FIG. 12, the magazine tray 21 is completely drawn out from the case 22.

Figure 13:
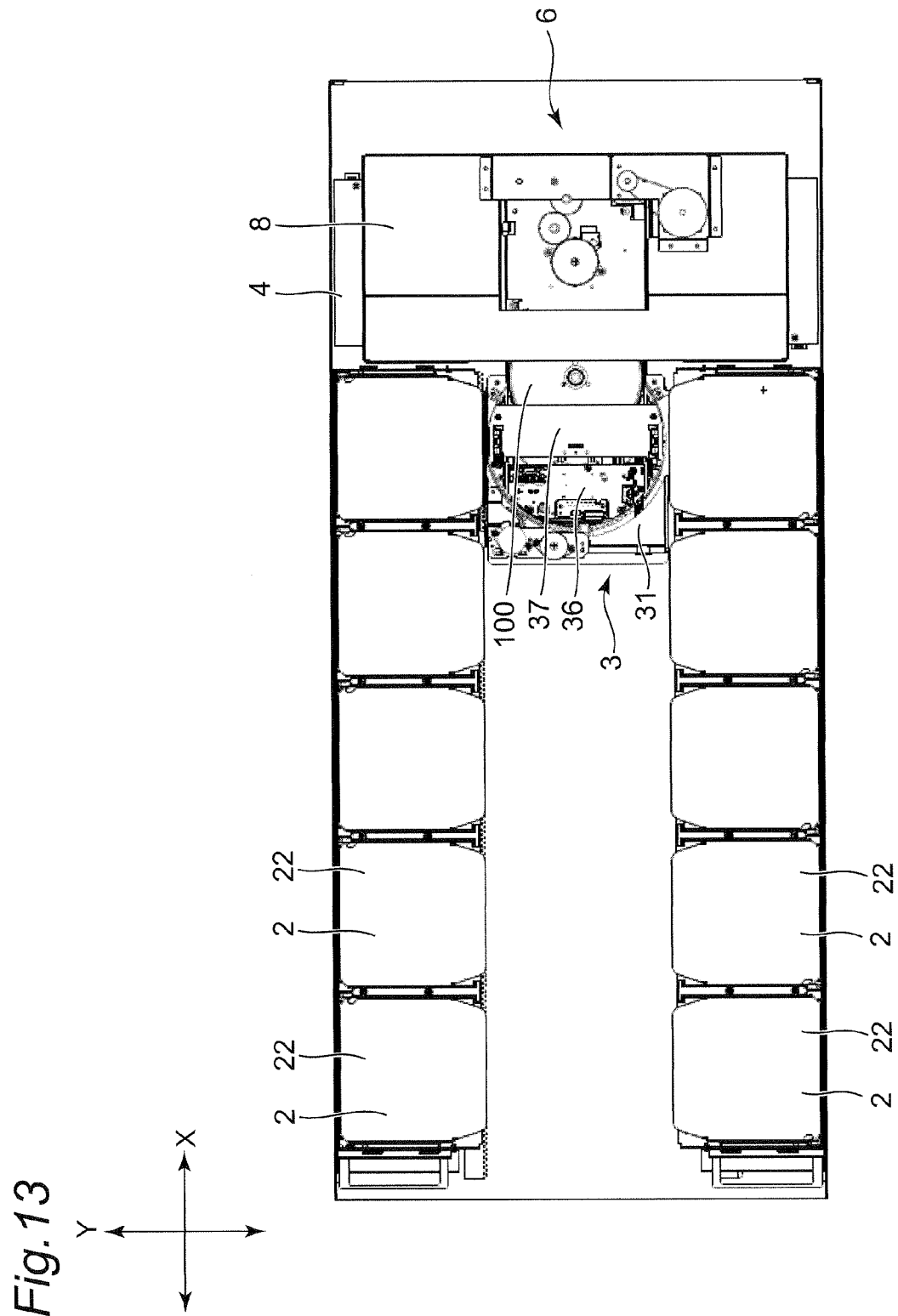
FIG. 13 is a plan view showing a state where the picker in FIG. 3 transfers the magazine tray from the magazine to the vicinity of the plurality of disc drives.
Figure 14:
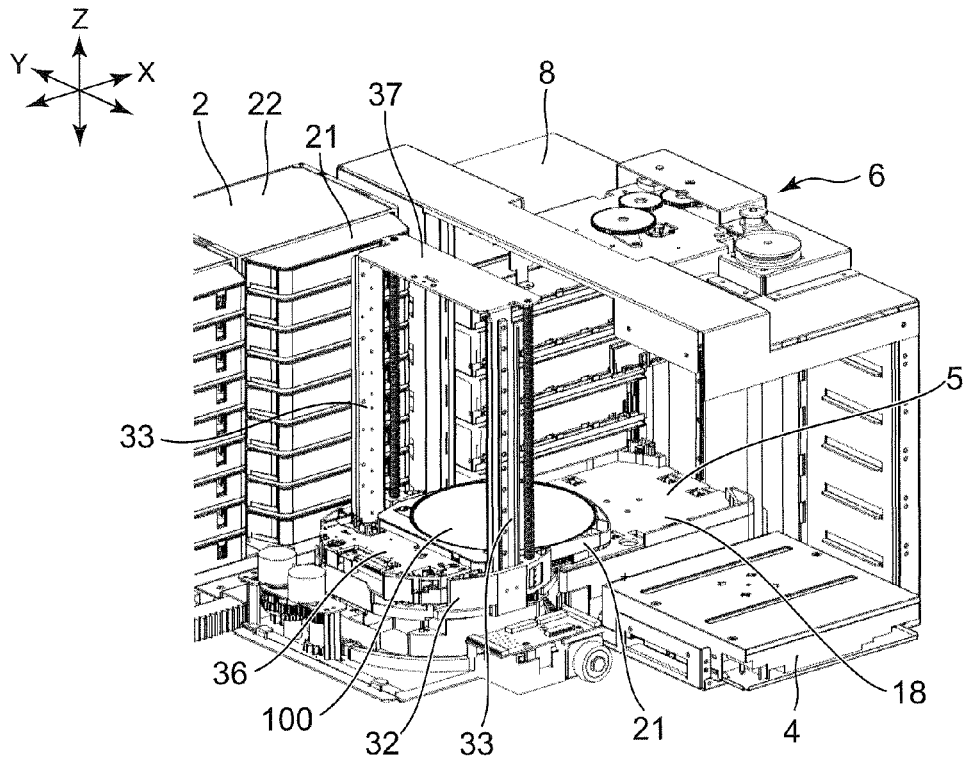
FIG. 14 is a perspective view showing a state where the picker in FIG. 3 transfers the magazine tray to the vicinity of the plurality of disc drives.
Figure 15:
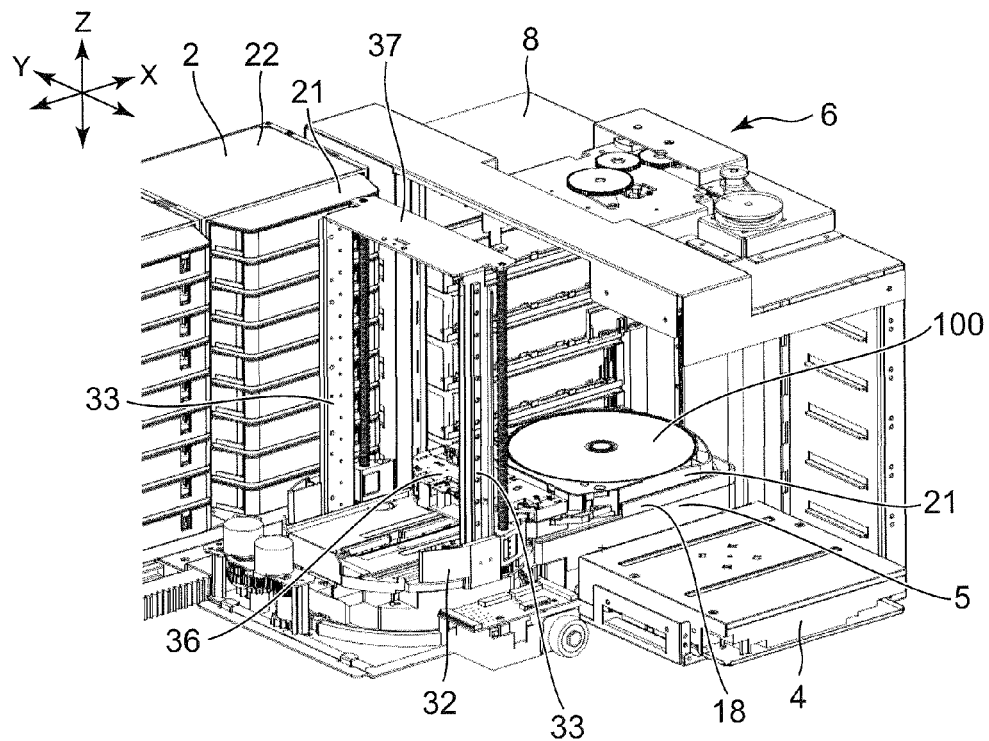
FIG. 15 is a perspective view showing a state where the picker in FIG. 3 moves the magazine tray to a place above a lifter provided in the disc apparatus in FIG. 1.

As shown in FIG. 12, the magazine tray 21 drawn out from the case 22 is conveyed to the location near the plurality of disc drives 4 as shown in FIGS. 13 and 14, by the run base of the picker 3 running to the apparatus-rear side. Thereafter, as shown in FIG. 15, the chuck 36 of the picker 3 advances, and the magazine tray 21 is placed at a prescribed position on the magazine tray guide 18 at the top of the lifter 5. It is to be noted that in FIGS. 14 and 15, the disc drives 4 on the near side are not shown.

The carrier 6 is arranged in a housing 8 for accommodating the plurality of (e.g., 12 sets of) disc drives 4. The carrier 6 is configured to: retain a plurality of discs pushed out by the lifter 5 in such a stacked state; separate one disc from the retained plurality of discs above a tray (not shown) ejected from an arbitrary disc drive 4; and place the separated disc on the tray 21.

As has been previously described, on the further rear side than the carrier 6 and the disc drive 4, a control unit 7 is arranged, which includes electric circuits, power source and the like. The control unit 7 is further provided with a controller 9. The operation of each constituent component of the disc apparatus Da such as picker 3, disc drive 4, carrier 6 (the operation of motor etc.) is controlled by the controller 9. The controller 9 is connected, for example, to a host computer which manages the data. Based on instructions from operator, the host computer sends commands to the controller 9 so as to perform operations such as data reading from or writing on the specified magazine 2. Based on the commands, the controller 9 controls the operation of each constituent component of the disc apparatus Da such as picker 3, disc drive 4, carrier 6 and the like.

Next, the plurality of disc drives 4 provided in the disc apparatus Da according to this embodiment, more specifically, the disc drive unit configured with the plurality of disc drives 4 as one unit will be described in detail.

As can be seen in FIG. 1, in this embodiment, the plurality of (for example, 12) disc drives 4 constitute two right and left rows, each including six vertically-stacked disc drives 4, and two rows of the disc drives 4L, 4R are arranged so as to be opposed to each other. That is, the right and left rows each include the disc drives 4 in six vertical stages, and the left and right disc drives 4L, 4R are opposed to each other in each stage.

FIG. 16 are side views showing the pair of opposed disc drives 4L, 4R in any of the six stages of disc drives 4. These side views are views when viewed from the lower left (front side of the apparatus Da) toward the upper right (rear side of the apparatus Da) in FIG. 1, and show, for the right disc drive 4R, only the vicinity of a front end from which a disc tray (hereinafter referred to as merely "tray" as appropriate) 51R is ejected.

FIG. 16 (a) shows a closed state in which trays 51L, 51R are stored in the left and right disc drives 4L, 4R, respectively, FIG. 16 (b) shows a state in which the tray (left tray) 51L is ejected from the left disc drive 4L, and FIG. 16 (c) shows a state in which the tray (right tray) 51R is ejected from the right disc drive 4R.

As apparent from FIG. 16 (b), in the state where the left tray 51L is ejected from the left disc drive 4L, a tray support (right tray support) 61R for supporting a lower surface of the front end of the left tray 51L protrudes from the right disc drive 4R opposed to the left disc drive 4L. As apparent from FIG. 16 (c), in the state where the right tray 51R is ejected from the right disc drive 4R, a tray support (left tray support) 61L for supporting a lower surface of the front end of the right tray 51R protrudes from the left disc drive 4L opposed to the right disc drive 4R.

Next, driving mechanisms for the tray 51 (51L, 51R) and the tray support 61 (61L, 61R) will be described.

Figure 17:
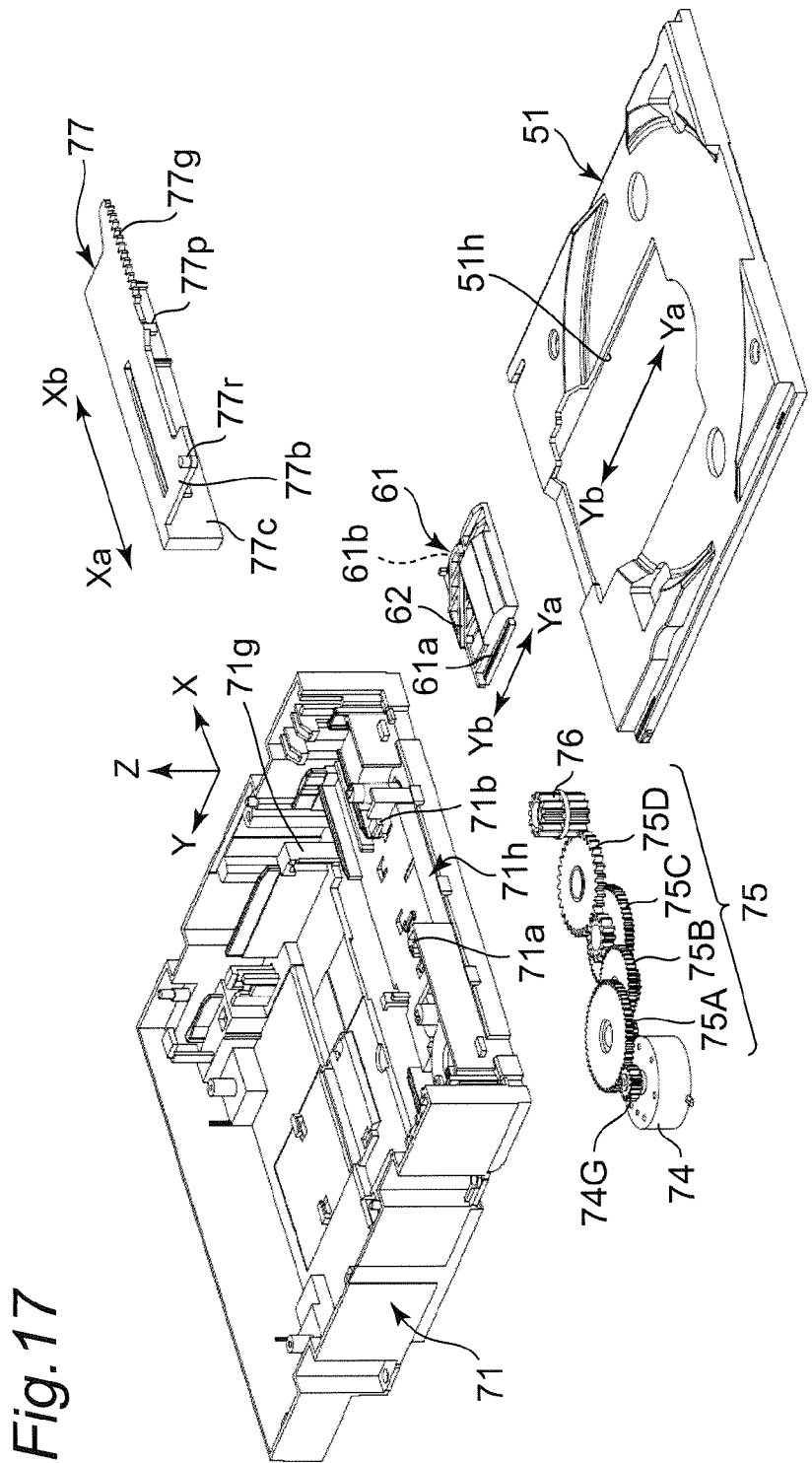
FIG. 17 is an exploded perspective view showing the disc drive in FIG. 16.
Figure 18:
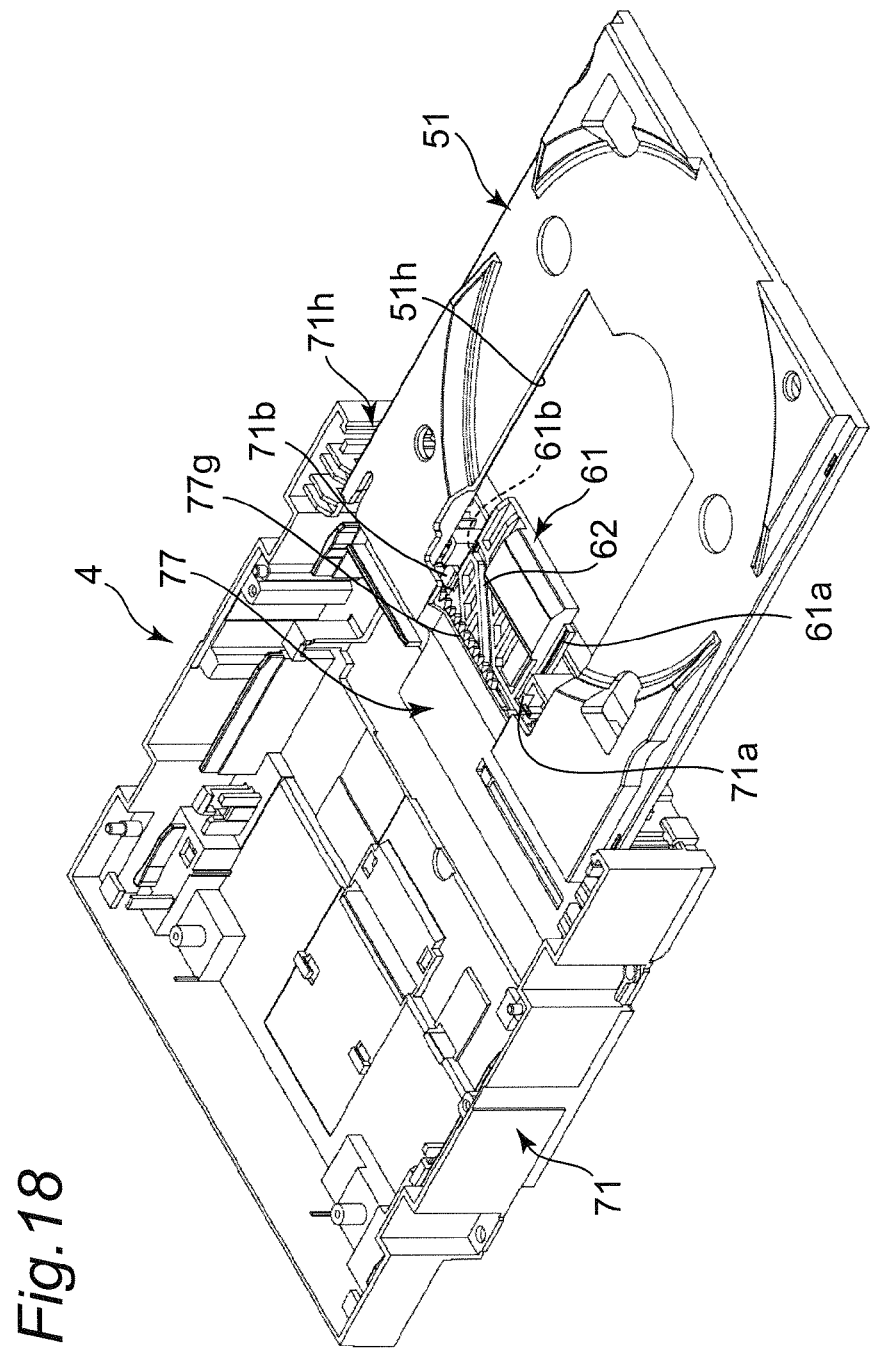
FIG. 18 is an overall perspective view showing the disc drive in FIG. 17 from diagonally above.
Figure 19:
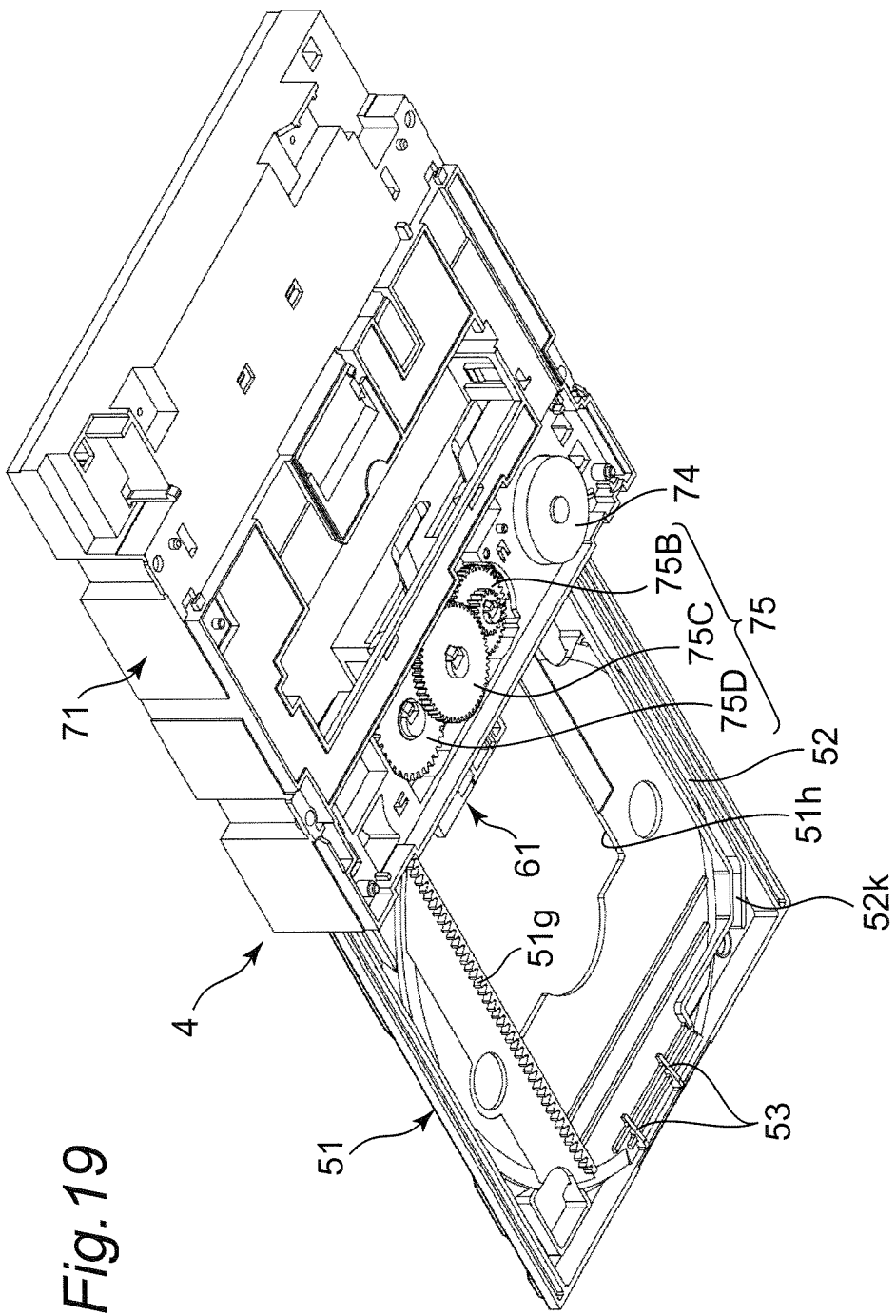
FIG. 19 is an overall perspective view showing the disc drive in FIG. 17 from diagonally below.

FIG. 17 is an exploded perspective view showing any disc drive 4 (4L, 4R), FIG. 18 is an overall perspective view showing the disc drive 4 in FIG. 17 when viewed from diagonally above, and FIG. 19 is an overall perspective view showing the disc drive 4 in FIG. 17 when viewed from diagonally below.

As shown in these figures, the disc drive 4 includes a chassis 71 forming a housing of the disc drive 4. The chassis 71 is formed into a box shape having a substantially rectangle or square in a plan view, and although not specifically shown, stores a conventional well-known traverse unit therein.

The traverse unit is configured by mounting required components including a turn table for rotatably supporting the disc 100, a spindle motor for rotatingly driving the turn table, an optical pickup for recording and/or reproducing an information signal on an optical disc, and a transfer mechanism on a base body (traverse base). The traverse unit and the components thereof are conventionally known and thus, are not shown to simplify the drawings.

As conventionally known, the traverse unit vertically swings about an end on the opposite side to an end opening 71h of the chassis 71 in cooperation with the action of ejecting the tray 51 from the chassis 71 and the action of storing the tray 51 into the chassis 71, preventing interference with the tray 51. A guide groove 71g for guiding the vertical swing action of the traverse unit is provided in an inner surface of the chassis 71 nearer to the end opening 71h.

As well known, the tray 51 is to feed the disc 100 onto the turn table (not shown) of the traverse unit, and slides to perform a stroke action between an opened position where the tray 51 is ejected outward from the end opening 71h of the chassis 71 and a closed position where the tray 51 is drawn into and stored in the chassis 71. Thus, a rack tooth 51g (tray rack) engageable with the driving gear 76 is formed on the lower surface of the tray 51. The upper surface parts 61a, 61b of the tray support 61 are supported below the tray 51 by hooks 71a, 71b provided on the chassis 71, and the tray support 61 slides to perform the stroke action between a protruding position where the tray support 61 protrudes outward from the end surface 4m of the disc drive 4 by a predetermined amount and a storage position where the tray support 61 is drawn into and stored in the disc drive 4.

An electric motor 74 capable of switchably rotating in forward and reverse directions, a relay gear set 75, the driving gear 76, and a slider 77, as driving mechanisms for driving the tray 51 and the tray support 61, are provided on the lower surface side of the chassis 71.

The relay gear set 75 is configured with a plurality of (for example, four) gears 75A, 75B, 75C, and 75D, and the input gear 75A engages with a motor output gear 74G fixed to an output shaft of the motor 74, and transmits power to the driving gear 76 via the intermediate gears 75B, 75C and the output gear 75D.

The slider 77 is formed into a substantially L-shaped plate when viewed from the side, which are constituted of a substantially rectangular base plate 77b in a plan view and a vertical wall 77c extending downward from the edge of the base plate 77b. A rack tooth 77g (slider rack) to be engaged with the driving gear 76 is provided on the opposite side to the vertical wall 77c of the base plate 77b. The slider rack 77g extends, on one end side in the tray stroke direction (Y-axis direction in FIG. 17: Ya-Yb direction), in an X-axis direction in FIG. 17 (Xa-Xb direction).

The base plate 77b of the slider 77 is provided with a pin (first engaging pin) 77p that protrudes downward from the base plate 77b and can engage with a (below-mentioned) cam groove 62 of the tray support 61, and a pin (second engaging pin) 77r that protrudes upward from the base plate 77b and can engage with a (below-mentioned) guide groove 52 of the tray 51.

The tray support 61 is arranged below the base plate 77b of the slider 77, and the cam groove 62 to be engaged with the first engaging pin 77p is formed on the tray support 61. As described later, the tray support 61 slides between the storage position and the protruding position in the Y-axis direction (Ya-Yb direction) in FIG. 17, according to the position where the cam groove 62 engages with the first engaging pin 77p. The relative positions of the tray 51 and the tray support 61 is set such that the sliding action is made mainly in a central opening 51h of the tray 51.

The guide groove 52 (tray guide groove) extending in substantially parallel to the tray rack 51g and in the tray stroke direction (Y-axis direction in FIG. 17) is formed on the lower surface of the tray 51. The second engaging pin 77r can engage with the tray guide groove 52 according to the sliding position of the slider 77 (that is, the position in the X-axis direction in FIG. 17). An inclined groove 52k is provided at a start end of the tray guide groove 52 in the Ya direction.

Protrusions 53 (53L, 53R: Refer to FIG. 16 (b) and FIG. 16 (c)) that come into contact with the upper surface of the tray support 61 when supported by the tray support 61 of the opposed disc drive 4 are provided on the lower surface of the front end of the tray 51 in the Ya direction.

Actions of the tray 51 and the tray support 61 of the disc drive 4 thus configured will be described.

In this embodiment, each disc drive 4 in the disc drive unit is connected to the controller 9 provided in the control unit 7 so as to transmit/receive a signal, and the disc drive 4 of which the tray 51 is ejected to the opened position is controlled according to the control signal from the controller 9. Accordingly, the protruding action of the tray support 61 from the opposed disc drive 4 to the protruding position is also controlled according to the control signal from the controller 9.

Figure 20A:
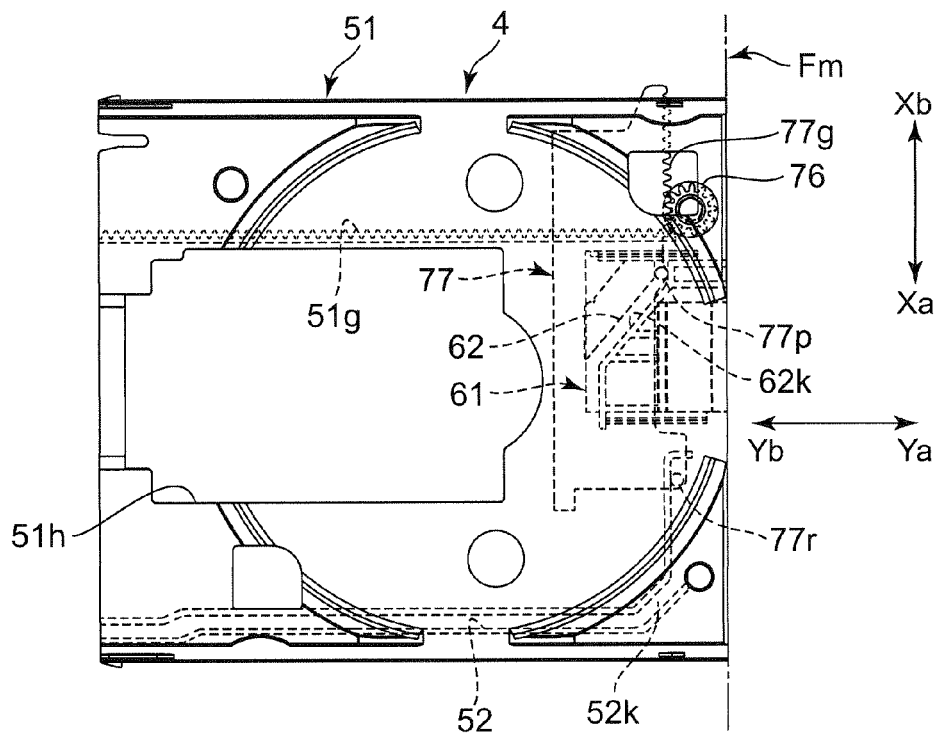
FIG. 20A is one of a series of explanatory views for describing actions of the tray and a tray support, and is a plan view showing an initial state where both of the tray and the tray support are respectively stored in the disc drive.
Figure 20B:
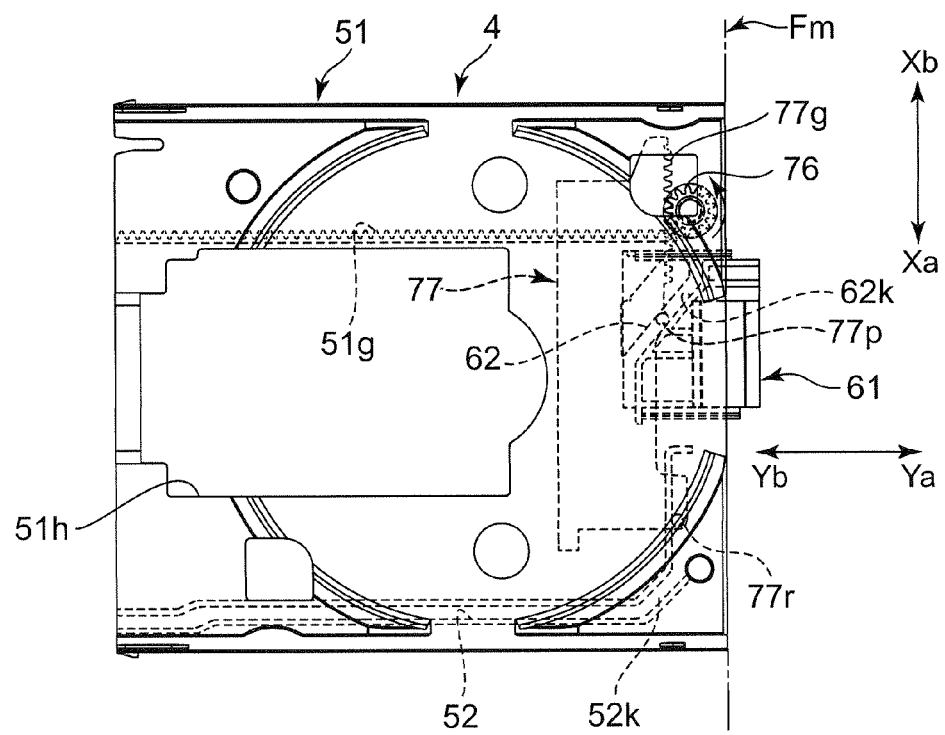
FIG. 20B is one of the series of explanatory views for describing actions of the tray and the tray support, and is a plan view showing a state where the tray support starts to protrude from the disc drive.
Figure 20C:
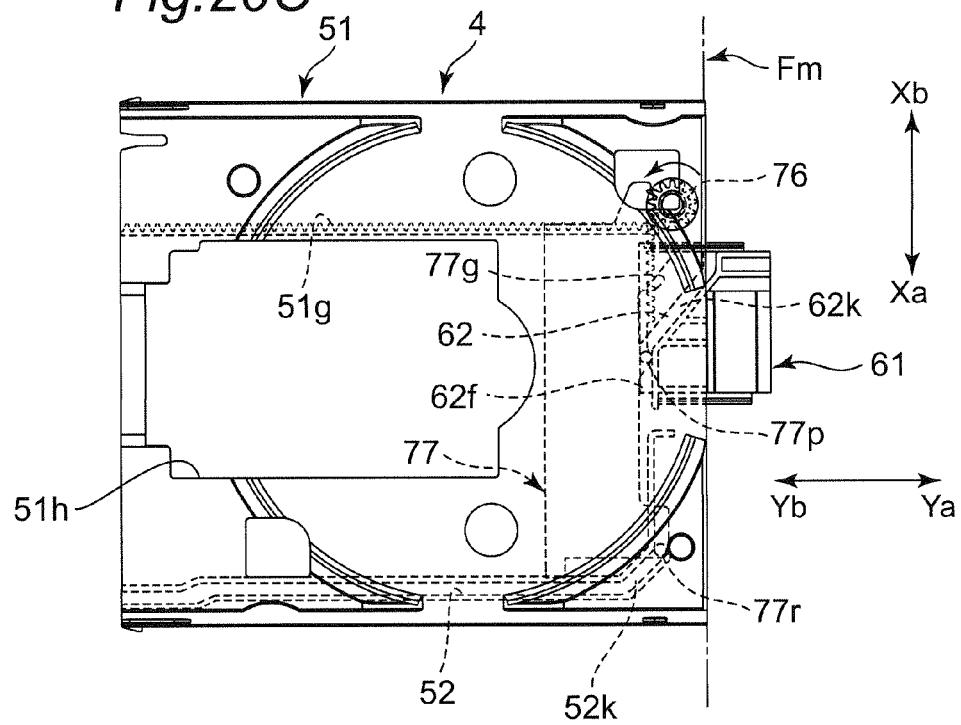
FIG. 20C is one of the series of explanatory views for describing actions of the tray and the tray support, and is a plan view showing a state where the tray support has protruded to a defined protruding position.
Figure 20D:
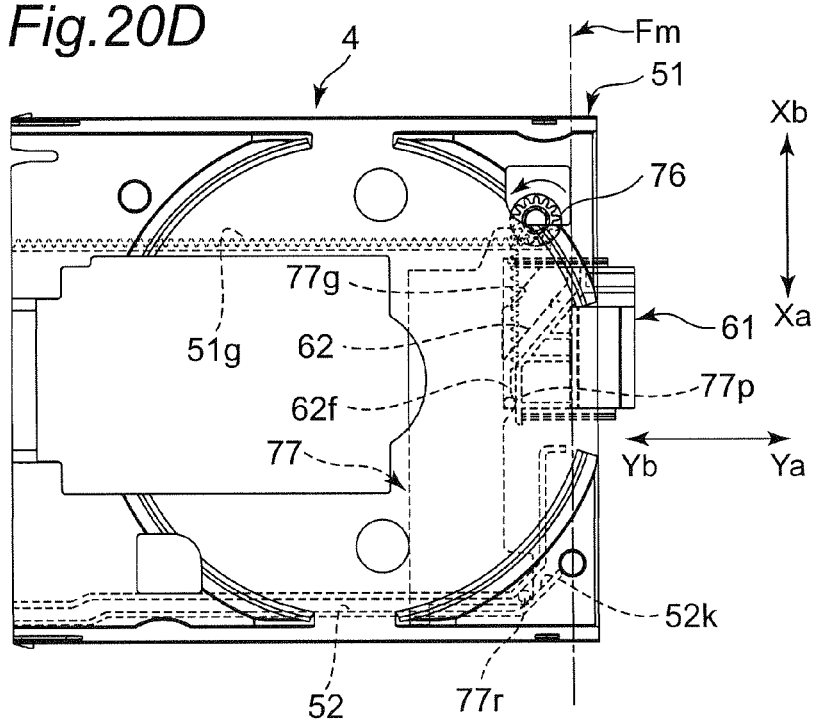
FIG. 20D is one of the series of explanatory views for describing actions of the tray and the tray support, is a plan view showing a state where the tray starts to be ejected from the disc drive.
Figure 20E:
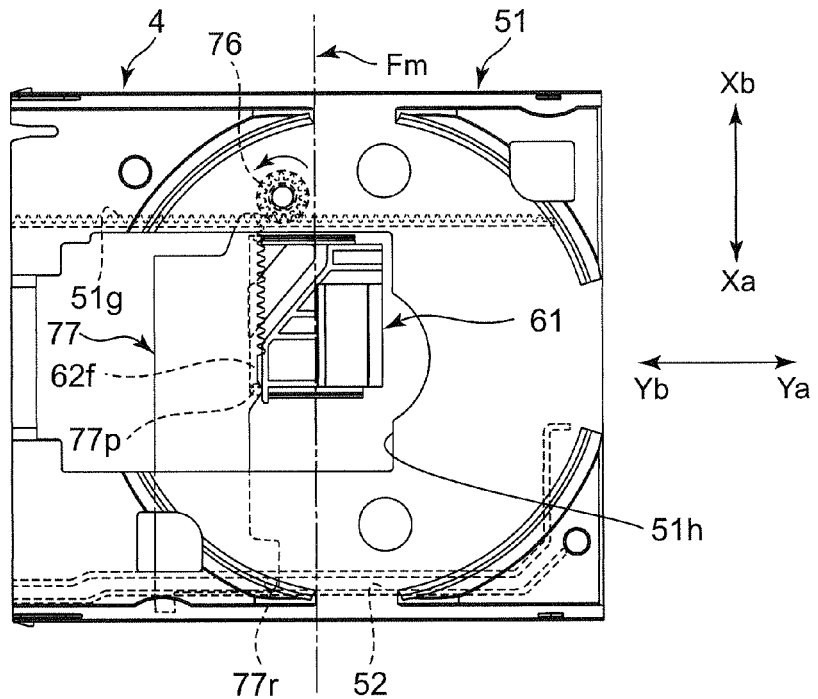
FIG. 20E is one of the series of explanatory views for describing actions of the tray and the tray support, and is a plan view showing a state where the tray is further ejected from the disc drive.
Figure 20F:
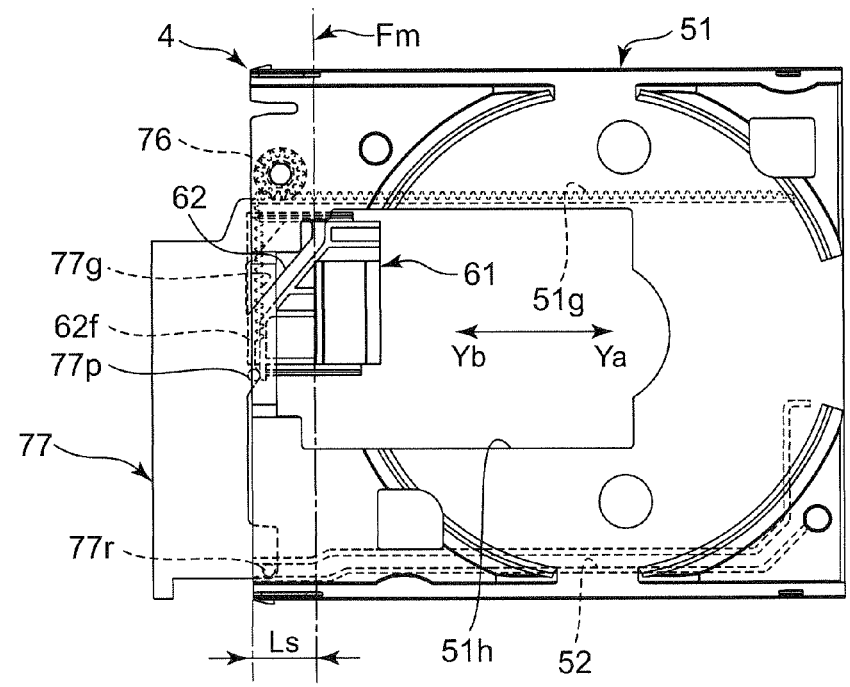
FIG. 20F is one of the series of explanatory views for describing actions of the tray and the tray support, and is a plan view showing a state where the tray has been ejected to a defined opened position.

FIGS. 20A to 20F are a series of explanatory views for describing the actions of the tray 51 and the tray support 61. FIG. 20A shows an initial state where both of the tray 51 and the tray support 61 are stored in the disc drive 4, FIG. 20B shows a state where the tray support 61 starts to protrude from the end surface 4m of the disc drive 4, and FIG. 20C shows a state where the tray support 61 protrudes to a defined protruding position. FIG. 20D shows a state where the tray 51 starts to be ejected from the end surface 4m of the disc drive 4, FIG. 20E shows a state where the tray 51 is further ejected, and FIG. 20F shows a state where the tray 51 is ejected to a defined opened position.

As shown in FIG. 20A, in the initial state where both of the tray 51 and the tray support 61 are stored in the disc drive 4, the first engaging pin 77p of the slider 77 is located at a start end of an inclined groove 62k of the cam groove 62 of the tray support 61 in the Ya direction, and the second engaging pin 77r is separated from the tray guide groove 52. In this state, the driving gear 76 engages with the slider rack 77g, but is just located near the tray rack 51g and does not engage with the tray rack 51g. At this time, end surfaces of the tray 51 and the tray support 61 in the Ya direction fall within a reference surface Fm corresponding to the end surface 4m of the disc drive 4 in the Ya direction.

In this initial state, when the controller 9 transmits the control signal for ejecting the tray 51 of the disc drive 4 to the opened position, the motor 74 is driven, thereby rotating the driving gear 76 in one direction (for example, counterclockwise direction). In this connection, as shown in FIG. 20B, the slider 77 slides in the Xa direction, and the first engaging pin 77p presses the inclined groove 62k of the cam groove 62 of the tray support 61 in the Ya direction while moving along the inclination. As a result, the tray support 61 is pushed in the Ya direction. In this state, the second engaging pin 77r is still separated from the tray guide groove 52, and the driving gear 76 does not engage with the tray rack 51g.

When the driving gear 76 continues to rotate in the same direction (counterclockwise direction), as shown in FIG. 20C, the first engaging pin 77p reaches a flat groove 62f of the cam groove 62. The flat groove 62f is a groove extending from an end of the inclined groove 62k in the Yb direction, along the Xa direction. Accordingly, even when the slider 77 further moves in the Xa direction thereafter, the first engaging pin 77p only moves in the flat groove 62f in the Xa direction, and does not apply any force in the Ya-Yb direction to the tray support 61. In this state, the protruding amount of the tray support 61 in the Ya direction becomes maximum, and corresponds to the defined protruding position.

In the case where the control signal from the controller 9 is not a signal for ejecting the tray 51 to the opened position, but a signal for protruding the tray support 61 to the defined protruding position, at this time, the motor 74 stops its driving to stop rotation of the driving gear 76. In this case, the tray 51 is not ejected from the disc drive 4, and only the tray support 61 remains protruded to the defined protruding position.

At this time, the second engaging pin 77r comes into contact with an inner wall of the inclined groove 52k of the tray guide groove 52. Then, when the slider 77 further slides slightly in the Xa direction, the second engaging pin 77r slightly pushes the inclined groove 52k in the Ya direction while moving along the inclination. Thereby, as shown in FIG. 20D, the driving gear 76 engages with the tray rack 51g. At this time, engagement between the driving gear 76 and the slider rack 77g is released to stop the slider 77.

When the driving gear 76 continues to rotate in the same direction (counterclockwise direction), as shown in FIG. 20E, the driving gear 76 engages with the tray rack 51g to drive the tray 51, thereby ejecting the tray 51 in the Ya direction. At this time, the second engaging pin 77r moves relatively in the tray guide groove 52 in the Yb direction.

Then, when the driving gear 76 further continues to rotate in the same direction (counterclockwise direction), as shown in FIG. 20F, the tray 51 is ejected to the maximum ejected position (opened position). In this state, a length Ls of the tray 51, which remains in the disc drive 4, substantially corresponds to the supporting length of the tray 51 at the opened position. At this time, the second engaging pin 77r comes into contact with a switch (not shown) provided to the disc drive 4, thereby stopping driving of the motor 74 to form the opened state of the tray 51.

In this embodiment, the supporting length Ls of the tray 51 at the opened position is set to be rather small. However, in the state where the tray 51 is ejected to the opened position, on the side of the opposite disc drive 4, the tray 51 is not ejected from the disc drive 4, and only the tray support 61 remains protruded to the defined protruding position (the state shown in FIG. 20C). Thus, even when the supporting length Ls of the tray 51 in the disc drive 4 at ejection of the tray is set as small as possible, it can be effectively suppressed that the ejected tray 51 undergoes a deflection so that the front end thereof hangs down (Refer to FIG. 16 (b) or FIG. 16 (c)).

To draw the tray 51 into the disc drive 4 for storage, for example, by reversing rotation of the motor 74 to rotate the driving gear 76 in the reverse direction, in the opposite manner to the above description, the actions are made in order from FIG. 20F to FIG. 20A. Thus, the tray 51 first is stored in the disc drive 4, and then the tray support 61 is stored in the disc drive 4.

As has been described, in the disc drive unit in this embodiment, regarding to the pair of opposed disc drives 4L, 4R located on the same horizontal plane, when the tray 51R, 51L of the other disc drive 4R, 4L is ejected, the tray support 61L, 61R protruding from one disc drive 4L, 4R supports the front end of the tray 51R, 51L. Accordingly, even when the supporting length Ls of the tray 51R, 51L in the other disc drive 4R, 4L at ejection of the tray is made as short as possible, it can be effectively suppressed that the ejected tray 51L, 51R undergoes a deflection so that the front end thereof hangs down. As a result, the other disc drive 4R, 4L can be reduced in size in the tray stroke direction without interfering with the smooth and stable stroke action of the tray 51R, 51L, which contributes to reduction of the disc drive unit in size.

Especially by configuring the two rows of many (12) vertically-stacked disc drives 4 in the disc drive unit, the other disc drive can be reduced in size in the tray stroke direction without interfering with the smooth and stable tray stroke action.

Further, like one disc drive 4L, 4R, the other disc drive 4R, 4L is provided with the tray support 61R, 61L for supporting the front end of the tray 51L, 51R when the tray 51L, 51R of the one disc drive 4L, 4R is ejected such that the tray support can protrude from the other disc drive 4R, 4L and withdraw into the same and therefore, also in the one disc drive 4L, 4R as well as the other disc drives 4R, 4L, even when the tray supporting lengths Ls in the disc drive 4L, 4R at ejection of the tray is made small as much as possible, it can be suppressed that the ejected tray 51L, 51R undergoes a deflection so that the front end thereof hangs down. As a result, the one disc drive 4L, 4R can be also reduced in size in the tray stroke direction without interfering with the smooth and stable tray stroke action, contributing to further reduction of the disc drive unit in size.

When the tray 51R, 51L of the other disc drive 4R, 4L is not ejected, the tray support 61L, 61R is stored in the one disc drive 4L, 4R, whereas when the tray 51R, 51L of the other disc drive 4R, 4L is ejected, the tray support 61L, 61R protrudes from the one disc drive 4L, 4R by a predetermined amount to support the front end of the other tray 51R, 51L. Therefore, when the tray 51R, 51L of the other disc drive 4R, 4L is not ejected, the tray support 61L, 61R does not interfere with the required operation performed in the space between the disc drives 4L, 4R.

Since the actions of the trays 51L, 51R and the tray supports 61L, 61R of the plurality of disc drives 4L, 4R are controlled according to the control signal from the controller 9 in the control unit 7, the actions of the tray 51R, 51L of the other disc drive 4R, 4L and the tray support 61L, 61R of the one disc drive 4L, 4R can be suitably controlled according to the control signal from the controller 9, achieving smooth movement of the trays 51L, 51R and the tray supports 61L, 61R of the pair of disc drives 4L, 4R easily and reliably.

Each of the disc drives 4 includes the driving gear 76 that receives power from the electric motor 74 as the power source and rotates, and the slider 77 that has the first engaging pin 77p engageable with the cam groove 62 of the tray support 61 and the second engaging pin 77r engageable with the guide groove 52 of the tray 51 and slides with rotation of the driving gear 76. The driving gear 76 rotates in one direction to slide the slider 77 in the predetermined direction, thereby causing the tray support 61 engaging with the first engaging pin 77p to protrude from the disc drive 4 and then the second engaging pin 77r to engage with the guide groove 52 of the tray 51, resulting in that the rack tooth 51g of the tray 51 engages with the driving gear 76, and the tray 51 is ejected from the disc drive 4 by the rotation of the driving gear 76 in the same direction.

Accordingly, the single power source (motor 74) can drive both the tray support 61 and the tray 51 to simplify the driving system of both the members. Since the tray support 61 and the tray 51 can be sequentially operated by rotating the driving gear 76 in one direction, the rotation of the driving gear 76 can be simply controlled, and the tray support 61 and the tray 51 can be smoothly operated.

Although the disc drive unit includes the two rows of many (12) vertically-stacked disc drives 4 in the above description, this disclosure is not limited to this, and can effectively apply the disc drive unit including the two opposed disc drives 4 arranged in the same horizontal plane.

Although both of the pair of opposed disc drives 4 each have the tray support 61 in the above description, this disclosure is not limited to this, and only one of the disc drives 4 has the tray support 61. In this case, only the other disc drive 4 can be reduced in size in the tray stroke direction.

In the above-described embodiments, the operation of each constituent component of the disc apparatus Da such as picker 3, disc drive 4, carrier 6 (the operation of motor etc.) is controlled by the controller 9 provided in the control unit 7 includes electric circuits, power source and the like. The controller 9 is connected, for example, to a host computer which manages the data. Based on instructions from operator, the host computer sends commands to the controller 9 so as to perform operations such as data reading from or writing on the specified magazine 2. Based on the commands, the controller 9 controls the operation of each constituent component of the disc apparatus Da such as picker 3, disc drive 4, carrier 6 and the like.

Such a control may be conducted by using so-called a "cloud computing system". FIG. 21 is a diagram schematically showing a system configuration example for controlling the disc apparatus through a cloud computing system.

As shown in FIG. 21, the cloud computing system includes a server Sc (so-called "cloud server") which is accessible through a network Nw. In this case, the disc apparatus Db includes a network communication section 310, for example, in a control unit 307. By virtue of this network communication section 310, the disc apparatus Db is accessibly connected to the cloud server Sc via the network Nw and is capable of communicating with the cloud server Sc. Such the network communication section 310 may be provided within the control unit 307 of the disc apparatus Db as explained above, or it may be separately provided from the control unit 307.

A user terminal equipment Pc capable of operating the disc apparatus Db is accessibly connected to the cloud server Sc via the network Nw and is capable of communicating with the cloud server Sc. A so-called "personal computer" having a microcomputer as a major part and a communication function may be employed as the user terminal equipment Pc, for example.

The cloud server Sc reserves, for example, at least a part of a program for execution of required controls and/or calculations which should be conducted by using the user terminal equipment Pc. Further, the cloud server Sc may store at least a part of a data and the like which are necessary for the execution of such the controls and/or the calculations. And, a required program and/or data may be downloaded and utilized, on a case-by-case basis, by request from user.

As shown in FIG. 21, a plurality of the above-described user terminal equipment Pc may be connected to the network Nw. Further, a plurality of the disc apparatus Db may be connected to the network Nw and respectively controlled.

It is to be noted that the above-described disc apparatus Db has the similar configuration and function to those of the aforementioned disc apparatus Da, except the point that it includes the network communication section 310 and is controlled by using the cloud server Sc.

By utilizing such the cloud computing system, it may be possible to simplify the constitution of the disc apparatus, the user terminal equipment and/or a memory device attached thereto, in contrast with the conventional case where the programs and/or the data are stored in those disc apparatus, user terminal equipment and/or memory device. In a case where the programs and/or the data are inevitably bloated, the remarkable benefits may be obtained.

It is to be noted that the cloud server Sc may be used as a data backup of the disc apparatus Db, instead of or in addition to the purpose for the execution of the calculations and/or the controls of the disc apparatus Db.

The embodiments have been described as technical examples of this disclosure. Appended figures and detailed description are provided.

Therefore, components shown and described in the appended figures and detailed description may include components indispensable for solving the problems as well as components that is not indispensable for solving the problems and illustrate the above-mentioned technique. For this reason, even if such non-essential components are described in the appended figures and detailed description, it should not conclude that the non-essential components are indispensable.

The above-mentioned embodiments serve to illustrate the technique in this disclosure and therefore, various changes, replacements, addition, and omission can be made within the scope of Claims and their equivalents.

INDUSTRIAL APPLICABILITY

This disclosure relates to a disc drive unit configured with a plurality of disc drives as one unit, and can be effectively used as a disc drive unit that can be used in, for example, a disc apparatus for feeding a disc to each of the plurality of disc drives. Also, this disclosure can be effectively used as a disc apparatus provided with such a disc drive unit.

What is claimed is:

1. A disc drive unit comprising a plurality of disc drives as one unit, wherein
at least one of a pair of the plurality of disc drives, the pair of disc drives opposing each other and being arranged on an identical horizontal plane, is provided with a tray support member for supporting a front end of a tray of another of the pair of disc drives when the tray is ejected, the tray support member being capable of protruding from the one disc drive and withdrawing into the one disc drive.

2. The disc drive unit according to claim 1,
wherein the plurality of disc drives includes two rows of vertically stacked disc drives, the two rows of vertically stacked disc drives being arranged so as to be opposed to each other, and
wherein the pair of disc drives are included in the two rows of vertically stacked disc drives.

3. The disc drive unit according to claim 1,
wherein when the tray is not ejected from the other disc drive, the tray support member is stored in the one disc drive, and when the tray of the other disc drive is ejected, the tray support member protrudes from the one disc drive by a predetermined amount and supports the front end of the tray.

4. The disc drive unit according to claim 1, further comprising
a controller for controlling actions of trays and tray support members of the plurality of disc drives, and when transmitting a control signal for ejecting the tray to the other disc drive, the controller transmits a control signal for causing the tray support member to protrude from the one disc drive.

5. The disc drive unit according to claim 1,
wherein each of the plurality of disc drives includes a driving gear for receiving power from a power source to rotate, and a sliding member having a first engaging member engageable with a tray support member and a second engaging member engageable with a tray, the sliding member being slid by rotation of the driving gear, and
wherein, for each of the plurality of disc drives, the driving gear rotates in one direction to slide the sliding member in a predetermined direction, causing the tray support member engaging with the first engaging member to protrude from the respective disc drive and causing the second engaging member to engage with the tray, resulting in that a rack tooth of the tray engages with the driving gear, and the tray is ejected from the respective disc drive by rotation of the driving gear in the one direction.

6. The disc drive unit according to claim 1,
wherein the other disc drive is provided with a tray support member for supporting a front end of a tray of the one disc drive when the tray is ejected, the tray support member being capable of protruding from the other disc drive and withdrawing into the other disc drive.

7. A disc apparatus for feeding a disc to each of a plurality of disc drives, the disc apparatus
comprising a disc drive unit configured with at least a part of the plurality of disc drives as one unit, wherein
in the disc drive unit, at least one of a pair of disc drives, the pair of disc drives opposing each other and being arranged on an identical horizontal plane, is provided with a tray support member for supporting a front end of a tray of another of the pair of disc drives when the tray is ejected, the tray support member being capable of protruding from the one disc drive and withdrawing into the one disc drive.

\* \* \* \* \*